(12) United States Patent
Niedermeyer

(10) Patent No.: US 12,456,759 B2
(45) Date of Patent: *Oct. 28, 2025

(54) NANOPARTICLE-ENHANCED LEAD-ACID ELECTRODE PASTE AND IMPROVED LEAD-ACID BATTERIES MADE THEREFROM

(71) Applicant: EVOQ NANO, INC., Salt Lake City, UT (US)

(72) Inventor: William H. Niedermeyer, West Jordan, UT (US)

(73) Assignee: EVOQ NANO, INC., Salt Lake City, UT (US)

(*) Notice: Subject to any disclaimer, the term of this patent is extended or adjusted under 35 U.S.C. 154(b) by 618 days.

This patent is subject to a terminal disclaimer.

(21) Appl. No.: 17/834,488

(22) Filed: Jun. 7, 2022

(65) Prior Publication Data

US 2022/0328886 A1    Oct. 13, 2022

Related U.S. Application Data

(63) Continuation-in-part of application No. PCT/US2022/071448, filed on Mar. 30, 2022, and a
(Continued)

(51) Int. Cl.
H01M 10/08      (2006.01)
H01M 4/02       (2006.01)
(Continued)

(52) U.S. Cl.
CPC .............. *H01M 10/08* (2013.01); *H01M 4/14* (2013.01); *H01M 4/20* (2013.01);
(Continued)

(58) Field of Classification Search
CPC .......... H01M 4/14; H01M 4/20; H01M 10/12; H01M 4/626; H01M 4/68; H01M 10/08; H01M 10/06
See application file for complete search history.

(56) References Cited

U.S. PATENT DOCUMENTS 3,133,023 A    5/1964  Vogel
4,121,017 A   10/1978  Dougherty et al.
(Continued)

FOREIGN PATENT DOCUMENTS

CA    2560837 A1    3/2007
CN  101128550 A     2/2008
(Continued)

OTHER PUBLICATIONS

Ding et al., CN 108091834; Espacenet machine translation, 2018 (Year: 2018).*
(Continued)

*Primary Examiner* — Adam A Arciero
(74) *Attorney, Agent, or Firm* — Workman Nydegger

(57) ABSTRACT

This disclosure relates to improved electrode pastes that include a carrier, basic lead sulfate compounds, and ground state metal nanoparticles formed by laser ablation (e.g., spherical-shaped nanoparticles). Improved lead-acid batteries can be made using improved electrode pastes that include a carrier, basic lead sulfate compounds, and ground state metal nanoparticles formed by laser ablation. Methods for manufacturing lead-acid batteries of improved performance include applying an improved electrode paste to a least a portion of the positive and/or negative electrodes, placing the electrodes in a container, and placing an electrolyte in contact with the electrodes. The metal nanoparticles may comprise or consist of gold. The metal nanoparticles may by spherical-shaped and/or coral-shaped.

21 Claims, 20 Drawing Sheets

Related U.S. Application Data continuation-in-part of application No. 17/216,996, filed on Mar. 30, 2021, now Pat. No. 11,646,453.

(60) Provisional application No. 63/197,605, filed on Jun. 7, 2021.

(51) Int. Cl.
*H01M 4/14* (2006.01)
*H01M 4/20* (2006.01)
*H01M 10/06* (2006.01)
*H01M 10/12* (2006.01)

(52) U.S. Cl.
CPC *H01M 2004/021* (2013.01); *H01M 2004/027* (2013.01); *H01M 2004/028* (2013.01); *H01M 10/06* (2013.01); *H01M 10/12* (2013.01)

(56) References Cited

U.S. PATENT DOCUMENTS

| | | |
|---|---|---|
| 4,515,740 A | 5/1985 | Schuettenberg et al. |
| 5,047,448 A | 9/1991 | Tanaka et al. |
| 5,227,608 A | 7/1993 | Yoshida et al. |
| 5,390,864 A | 2/1995 | Alexander |
| 5,585,020 A | 12/1996 | Becker et al. |
| 5,677,075 A | 10/1997 | Fujita |
| 6,051,279 A | 4/2000 | Gualco et al. |
| 6,232,264 B1 | 5/2001 | Lukehart et al. |
| 6,239,453 B1 | 5/2001 | Yamada et al. |
| 6,509,070 B1 | 1/2003 | Voevodin et al. |
| 6,660,379 B1 | 12/2003 | Lakowicz et al. |
| 6,720,006 B2 | 4/2004 | Hanke et al. |
| 7,014,737 B2 | 3/2006 | Harutyunyan et al. |
| 7,252,814 B2 | 8/2007 | De et al. |
| 7,332,351 B2 | 2/2008 | Tan et al. |
| 7,371,457 B2 | 5/2008 | Oldenburg et al. |
| 7,374,730 B2 | 5/2008 | Simard et al. |
| 7,384,560 B2 | 6/2008 | Martens et al. |
| 7,449,679 B2 | 11/2008 | Plewa et al. |
| 7,509,993 B1 | 3/2009 | Turng et al. |
| 7,527,824 B2 | 5/2009 | Becker et al. |
| 7,553,801 B2 | 6/2009 | Alexander et al. |
| 7,625,637 B2 | 12/2009 | Kim |
| 7,662,731 B2 | 2/2010 | Toh et al. |
| 7,682,970 B2 | 3/2010 | Grigoropoulos et al. |
| 7,700,032 B1 | 4/2010 | Lu et al. |
| 7,884,160 B2 | 2/2011 | Wang et al. |
| 7,967,876 B2 | 6/2011 | Aradi et al. |
| 7,985,367 B2 | 7/2011 | Hiromatsu et al. |
| 8,097,233 B2 | 1/2012 | Porterat |
| 8,435,602 B1 | 5/2013 | Seal |
| 8,490,583 B1 | 7/2013 | Gardenier |
| 8,490,586 B2 | 7/2013 | Ross et al. |
| 8,524,139 B2 | 9/2013 | Toth et al. |
| 8,545,577 B2 | 10/2013 | Tock et al. |
| 8,685,293 B1 | 4/2014 | Coppa et al. |
| 8,709,531 B2 | 4/2014 | Miller |
| 8,802,234 B2 | 8/2014 | Che et al. |
| 8,883,865 B2 | 11/2014 | Difrancesco et al. |
| 8,992,815 B2 | 3/2015 | Hu et al. |
| 9,259,407 B2 | 2/2016 | Baker et al. |
| 9,434,006 B2 | 9/2016 | Niedermeyer |
| 9,463,510 B2 | 10/2016 | Hendi et al. |
| 9,512,377 B2 | 12/2016 | Binder et al. |
| 9,627,713 B2 | 4/2017 | Moganty et al. |
| 9,839,652 B2 | 12/2017 | Tarbet et al. |
| 9,849,512 B2 | 12/2017 | Niedermeyer |
| 9,883,670 B2 | 2/2018 | Niedermeyer |
| 9,885,001 B2 | 2/2018 | Niedermeyer |
| 9,919,363 B2 | 3/2018 | Niedermeyer |
| 10,099,191 B1 | 10/2018 | Lu et al. |
| 10,774,429 B2 | 9/2020 | Tarbet et al. |
| 11,018,376 B2 | 5/2021 | Niedermeyer |
| 11,646,453 B2 | 5/2023 | Niedermeyer |
| 2001/0031564 A1 | 10/2001 | Suzuki et al. |
| 2002/0051823 A1 | 5/2002 | Yan et al. |
| 2003/0012686 A1 | 1/2003 | Andresen et al. |
| 2003/0086859 A1 | 5/2003 | Kawakami et al. |
| 2003/0102099 A1 | 6/2003 | Yadav et al. |
| 2003/0108612 A1 | 6/2003 | Xu et al. |
| 2003/0129320 A1 | 7/2003 | Yu |
| 2003/0182972 A1* | 10/2003 | Reher ............ H01M 4/627 65/437 |
| 2003/0228525 A1 | 12/2003 | Kozawa et al. |
| 2004/0103936 A1 | 6/2004 | Andriessen |
| 2004/0214001 A1 | 10/2004 | Oldenburg et al. |
| 2005/0061779 A1 | 3/2005 | Blumenfeld et al. |
| 2005/0061785 A1 | 3/2005 | Schroder et al. |
| 2005/0153071 A1 | 7/2005 | Bouvrette et al. |
| 2005/0158506 A1 | 7/2005 | Waki et al. |
| 2005/0247866 A1 | 11/2005 | Plewa et al. |
| 2005/0258149 A1 | 11/2005 | Glukhoy et al. |
| 2005/0260276 A1 | 11/2005 | Yang et al. |
| 2006/0049034 A1 | 3/2006 | Lee et al. |
| 2006/0142853 A1 | 6/2006 | Wang et al. |
| 2007/0003603 A1 | 1/2007 | Karandikar et al. |
| 2007/0029185 A1 | 2/2007 | Tung |
| 2007/0125196 A1 | 6/2007 | Zhong et al. |
| 2007/0140951 A1 | 6/2007 | O'Brien et al. |
| 2007/0141259 A1 | 6/2007 | House et al. |
| 2007/0207335 A1 | 9/2007 | Karandikar et al. |
| 2007/0269576 A1 | 11/2007 | Barton et al. |
| 2007/0287202 A1 | 12/2007 | Maehashi et al. |
| 2008/0006524 A1 | 1/2008 | Liu et al. |
| 2008/0035682 A1 | 2/2008 | Coffey et al. |
| 2008/0044148 A1 | 2/2008 | Robinson et al. |
| 2008/0050448 A1 | 2/2008 | Wilson et al. |
| 2008/0143021 A1 | 6/2008 | Ehrentraut et al. |
| 2008/0161631 A1 | 7/2008 | Axtell et al. |
| 2008/0241490 A1 | 10/2008 | Newman et al. |
| 2008/0263940 A1 | 10/2008 | Parish et al. |
| 2008/0292673 A1 | 11/2008 | Crudden |
| 2009/0000186 A1 | 1/2009 | Sanders et al. |
| 2009/0028947 A1 | 1/2009 | Rahman Nia |
| 2009/0039316 A1 | 2/2009 | Hirai et al. |
| 2009/0061230 A1 | 3/2009 | Berkei et al. |
| 2009/0104179 A1 | 4/2009 | Boyden et al. |
| 2009/0117268 A1 | 5/2009 | Lewis et al. |
| 2009/0148484 A1 | 6/2009 | Lin et al. |
| 2009/0175948 A1 | 7/2009 | Jiang et al. |
| 2009/0191288 A1 | 7/2009 | Squires |
| 2009/0214766 A1 | 8/2009 | Magdassi et al. |
| 2009/0246530 A1 | 10/2009 | Murakami et al. |
| 2010/0040655 A1 | 2/2010 | Ren et al. |
| 2010/0050872 A1 | 3/2010 | Lee |
| 2010/0068299 A1 | 3/2010 | Van et al. |
| 2010/0072645 A1 | 3/2010 | Hiromatsu et al. |
| 2010/0080957 A1 | 4/2010 | Chinn et al. |
| 2010/0092367 A1 | 4/2010 | Porterat |
| 2010/0154591 A1 | 6/2010 | Islam |
| 2010/0167958 A1 | 7/2010 | Lin et al. |
| 2010/0172997 A1 | 7/2010 | Omary et al. |
| 2010/0180413 A1 | 7/2010 | Jeong |
| 2010/0183739 A1 | 7/2010 | Newman |
| 2010/0187091 A1 | 7/2010 | Pierce et al. |
| 2010/0196192 A1 | 8/2010 | Liu et al. |
| 2010/0212221 A1 | 8/2010 | Aradi |
| 2010/0255110 A1 | 10/2010 | Yoon et al. |
| 2010/0272650 A1 | 10/2010 | Tsukada et al. |
| 2010/0272770 A1 | 10/2010 | De et al. |
| 2010/0301013 A1 | 12/2010 | Conneely et al. |
| 2011/0039078 A1 | 2/2011 | Brennan et al. |
| 2011/0052460 A1 | 3/2011 | Coffey et al. |
| 2011/0129536 A1 | 6/2011 | Donati et al. |
| 2011/0155643 A1 | 6/2011 | Tov et al. |
| 2011/0192450 A1 | 8/2011 | Liu et al. |
| 2011/0193025 A1 | 8/2011 | Ichikawa et al. |
| 2011/0196044 A1 | 8/2011 | Hu et al. |
| 2011/0197369 A1 | 8/2011 | Hinestroza et al. |
| 2011/0201527 A1 | 8/2011 | Lin et al. |
| 2011/0206753 A1 | 8/2011 | Karpov et al. |
| 2011/0228890 A1 | 9/2011 | Dean et al. |
| 2011/0244056 A1 | 10/2011 | Santra |

(56) References Cited

U.S. PATENT DOCUMENTS

| | | |
|---|---|---|
| 2011/0297653 A1 | 12/2011 | Ehrentraut et al. |
| 2012/0070729 A1 | 3/2012 | Wertz et al. |
| 2012/0088066 A1 | 4/2012 | Aytug et al. |
| 2012/0094036 A1 | 4/2012 | Droege et al. |
| 2012/0124899 A1 | 5/2012 | Difrancesco et al. |
| 2012/0136164 A1 | 5/2012 | Ying et al. |
| 2012/0138347 A1 | 6/2012 | Bahnmueller et al. |
| 2012/0138862 A1 | 6/2012 | Hogan |
| 2012/0164073 A1 | 6/2012 | Xu et al. |
| 2012/0174472 A1 | 7/2012 | Mills |
| 2012/0183674 A1 | 7/2012 | Bonn-Savage et al. |
| 2012/0225021 A1 | 9/2012 | Qian et al. |
| 2012/0301528 A1 | 11/2012 | Uhlmann et al. |
| 2012/0301531 A1 | 11/2012 | Uhlmann et al. |
| 2012/0313200 A1 | 12/2012 | Jackrel et al. |
| 2012/0328701 A1 | 12/2012 | Edelson et al. |
| 2013/0001833 A1 | 1/2013 | Niedermeyer |
| 2013/0078510 A1 | 3/2013 | Reynolds et al. |
| 2013/0116369 A1 | 5/2013 | Qi et al. |
| 2013/0152823 A1 | 6/2013 | Fouda et al. |
| 2013/0203849 A1 | 8/2013 | Ben Yehuda |
| 2013/0224477 A1 | 8/2013 | Xu et al. |
| 2013/0273116 A1 | 10/2013 | Jespersen et al. |
| 2013/0334104 A1 | 12/2013 | Halas et al. |
| 2013/0337189 A1 | 12/2013 | Miller |
| 2013/0337998 A1 | 12/2013 | Irving et al. |
| 2014/0024026 A1 | 1/2014 | Alocilja et al. |
| 2014/0178513 A1 | 6/2014 | Matthews |
| 2014/0221543 A1 | 8/2014 | Wang et al. |
| 2014/0239239 A1 | 8/2014 | Cha et al. |
| 2014/0274830 A1 | 9/2014 | Pol et al. |
| 2014/0288194 A1 | 9/2014 | Niedermeyer |
| 2014/0322351 A1 | 10/2014 | Gawande et al. |
| 2014/0370293 A1 | 12/2014 | Johnson |
| 2015/0008313 A1 | 1/2015 | Loboda et al. |
| 2015/0030919 A1 | 1/2015 | Kozawa et al. |
| 2015/0066135 A1 | 3/2015 | Weber et al. |
| 2015/0190550 A1 | 7/2015 | Nusko et al. |
| 2016/0081346 A1 | 3/2016 | Niedermeyer |
| 2016/0081347 A1 | 3/2016 | Niedermeyer |
| 2016/0082513 A1 | 3/2016 | Niedermeyer |
| 2016/0082514 A1 | 3/2016 | Niedermeyer |
| 2016/0083146 A1 | 3/2016 | Han |
| 2016/0083665 A1 | 3/2016 | Niedermeyer |
| 2016/0083901 A1 | 3/2016 | Niedermeyer |
| 2016/0144350 A1 | 5/2016 | Aizenberg et al. |
| 2016/0287631 A1 | 10/2016 | Tarbet et al. |
| 2016/0298243 A1 | 10/2016 | Tarbet et al. |
| 2016/0372243 A1 | 12/2016 | Cassignol et al. |
| 2017/0129975 A1 | 5/2017 | Hallinan et al. |
| 2017/0136112 A1 | 5/2017 | Pillich et al. |
| 2017/0166485 A1 | 6/2017 | Hong et al. |
| 2017/0209490 A1 | 7/2017 | Niedermeyer |
| 2018/0078580 A1 | 3/2018 | Tarbet et al. |
| 2018/0126463 A1 | 5/2018 | Niedermeyer |
| 2018/0282852 A1 | 10/2018 | Soloway |
| 2018/0368417 A1 | 12/2018 | Niedermeyer |
| 2019/0165426 A1 | 5/2019 | Niedermeyer |
| 2019/0225498 A1 | 7/2019 | Ruiz et al. |
| 2021/0226259 A1 | 7/2021 | Niedermeyer |
| 2022/0386619 A1 | 12/2022 | Niedermeyer |

FOREIGN PATENT DOCUMENTS

| | | |
|---|---|---|
| CN | 101180372 A | 5/2008 |
| CN | 101415644 A | 4/2009 |
| CN | 101716684 A | 6/2010 |
| CN | 101932752 A | 12/2010 |
| CN | 101960070 A | 1/2011 |
| CN | 102120619 A | 7/2011 |
| CN | 102753628 A | 10/2012 |
| CN | 103700898 A | 4/2014 |
| CN | 103796946 A | 5/2014 |
| CN | 103891558 A | 7/2014 |
| CN | 103917546 A | 7/2014 |
| CN | 104014811 A | 9/2014 |
| CN | 107107199 A | 8/2017 |
| CN | 108091834 A | 5/2018 |
| CN | 111566854 A | 8/2020 |
| DE | 102005044360 A1 | 3/2007 |
| EP | 2140958 A2 | 1/2010 |
| EP | 2559436 A1 | 2/2013 |
| EP | 3197622 A1 | 8/2017 |
| GB | 2442051 A | 3/2008 |
| JP | 54-069726 A | 6/1979 |
| JP | 11-126634 A | 5/1999 |
| JP | 2006-351465 A | 12/2006 |
| JP | 2007-109618 A | 4/2007 |
| JP | 2008-527169 | 7/2008 |
| JP | 2010-001528 A | 1/2010 |
| KR | 2006-0021749 A | 3/2006 |
| WO | 2005/027255 A1 | 3/2005 |
| WO | 2005/094501 A2 | 10/2005 |
| WO | 2006/026026 A2 | 3/2006 |
| WO | 2006/053225 A2 | 5/2006 |
| WO | 2006/062826 A2 | 6/2006 |
| WO | 2006/126823 A1 | 11/2006 |
| WO | 2008/043396 A1 | 4/2008 |
| WO | 2008/153239 A1 | 12/2008 |
| WO | 2009/025955 A1 | 2/2009 |
| WO | 2009/044146 A1 | 4/2009 |
| WO | 2009/046081 A2 | 4/2009 |
| WO | 2009/066011 A2 | 5/2009 |
| WO | 2009/091900 A1 | 7/2009 |
| WO | 2011/045627 A1 | 4/2011 |
| WO | 2012/082364 A1 | 6/2012 |
| WO | 2013/006430 A2 | 1/2013 |
| WO | 2013/141879 A1 | 9/2013 |
| WO | 2014/066850 A2 | 5/2014 |
| WO | 2014/096556 A2 | 6/2014 |
| WO | 2014/137352 A1 | 9/2014 |
| WO | 2014/190097 A1 | 11/2014 |
| WO | 2016/007112 A1 | 1/2016 |
| WO | 2016/007113 A1 | 1/2016 |
| WO | 2016/049132 A1 | 3/2016 |

OTHER PUBLICATIONS

Phuoc et al, "Synthesis of Ag-deoionized water nanofluids using multi-beam laser ablation in fluids", Optics and Lasers in Engineering 45 (2007) 1099-1106.

Prabhu et al., "Silver nanoparticles: mechanism of antimicrobial action, synthesis, medical applications, and toxicity effects", International Nano Letters, 2012, 2:32, pp. 1-10.

Rawashdeh et al., "Antibacterial Mechanisms of Metallic Nanoparticles: A Review", Dynamic Biochemistry, Process Biotechnology and Molecular Biology 2009 pp. 12-20.

Rhim, J-W. et al. "Preparation and characterization of bionanocomposite films of agarand silver nanoparticles: Laser ablation method" Carbohydrate Polymers 103 (2014) 456-465 (Year: 2014).

Riabinina et al., "Influence of pressure on the Pt nanoparticle growth modes during pulsed laser ablation", Journal of Applied Physics 108, 034322 (2010, published online Aug. 12, 2010).

Samberg et al. (Nanotoxicology 2011 ;5(2):244-253) (Year: 2011).

Santos et al., "Enhancement of antibiotic effect via gold:silver-alloy nanoparticles", J. Nanopart Res (2012) 14:859, pp. 1-8.

Sweeney et al., "Rapid Purification and Size Separation of Gold Nanoparticles via Diafiltration", J. Am. Chem. Soc. 2006, 128, 3190-3197 (Published on web Feb. 18, 2006).

Sylvestre et al., "Surface Chemistry of Gold Nanoparticles Produced by Laser Ablation in Aqueous Media", J Phys. Chem. B 2004, 108, 16864-16869.

Thanaa Majied Al-Nori, "Antibacterial activity of Silver and Gold Nanoparticles against *Streptococus, Staphylococcus aureus* and *E.coli*", A1—Mustansiriya J. Sci, Vo. 23, No. 3, 2012.

Theodorou et al., "Inhalation of Silver Nanomaterials—Seeing the Risks", International Journal of Molecular Sciences, 2014, 15, 23936-23974.

Tu et al. "Nanoporous Polymer-Ceramic Composite Electrolytes for Lithium Metal Batteries", Adv. Energy Mater., 2014; 4: 1300654.

(56) References Cited

OTHER PUBLICATIONS

U.S. Appl. filed Apr. 1, 2016, Tarbet et al., U.S. Appl. No. 15/088,863.
U.S. Appl. filed Apr. 13, 2016, Tarrbet et al., U.S. Appl. No. 15/098,071.
U.S. Appl. filed Jan. 25, 2017, Niedermeyer., U.S. Appl. No. 15/415,562.
U.S. Appl. filed Jun. 19, 2018, Niedermeyer., U.S. Appl. No. 16/012,508.
U.S. Appl. filed Jun. 6, 2014, Neidermeyer., U.S. Appl. No. 14/298,593.
U.S. Appl. filed Jun. 6, 2014, Neidermeyer., U.S. Appl. No. 14/298,594.
U.S. Appl. filed Jun. 6, 2014, Neidermeyer., U.S. Appl. No. 14/298,598.
U.S. Appl. filed May 10, 2018, Niedermeyer., U.S. Appl. No. 15/976,447.
U.S. Appl. filed Nov. 29, 2017, Tarbet et al., U.S. Appl. No. 15/829,512.
U.S. Appl. filed Nov. 9, 2017, Niedermeyer., U.S. Appl. No. 15/808,088.
U.S. Appl. filed Sep. 22, 2015, Neidermeyer., U.S. Appl. No. 14/861,243.
U.S. Appl. filed Sep. 22, 2015, Neidermeyer., U.S. Appl. No. 14/861,318.
U.S. Appl. filed Sep. 22, 2015, Neidermeyer., U.S. Appl. No. 14/861,375.
U.S. Appl. filed Sep. 22, 2015, Neidermeyer., U.S. Appl. No. 14/861,442.
U.S. Appl. filed Sep. 22, 2015, Neidermeyer., U.S. Appl. No. 14/861,500.
U.S. Appl. filed Sep. 22, 2015, Neidermeyer., U.S. Appl. No. 14/861,562.
U.S. Appl. No. 15/098,071, filed Apr. 13, 2016, Tarbet et al.
U.S. Application filed Jun. 19, 2018, by Niedermeyer, U.S. Appl. No. 16/012,508.
U.S. Application filed Nov. 27, 2018, by Niedermeyer, U.S. Appl. No. 16/202,078.
U.S. Patent Application filed Apr. 1, 2016, by Tarbet et al., U.S. Appl. No. 15/088,863.
U.S. Patent Application filed Jan. 25, 2017, by Niedermeyer, U.S. Appl. No. 15/415,562.
U.S. Patent Application filed Jun. 6, 2014, by Neidermeyer, U.S. Appl. No. 14/298,594.
U.S. Patent Application filed Sep. 22, 2015, by Neidermeyer, U.S. Appl. No. 14/861,375.
U.S. Patent Application filed Sep. 22, 2015, by Neidermeyer, U.S. Appl. No. 14/861,442.
Xiang Dongxi, "Study of Silver-nanoparticles on antiviral action", Journal of Dalian Medical University, vol. 31, No. 6, 2009.
Xinxia Yue, et al., "Preparation of silver nanoparticles by tea extracts and its application in the antibacterial finishing of cotton fabric", 2014, Shanghai Textile Science & Technology, vol. 42, No. 5, p. 45-49.
Yuteng Wan et al., "Modification of coral-like SnO2 nanostructures with dense TiO2 nanoparticles for a self-cleaning gas sensor", Talanta, vol. 99, pp. 394-403.
International Preliminary Report on Patentability received for PCT Patent Application No. PCT/US15/051643, mailed on Apr. 6, 2017, 7 pages.
International Preliminary Report on Patentability received for PCT Patent Application No. PCT/US2018/062864, mailed on Jun. 11, 2020, 8 pages.
International Preliminary Report on Patentability received for PCT Patent Application No. PCT/US22/71448, mailed on Oct. 12, 2023, 6 pages.
International Search Report and Written Opinion received for PCT Patent Application No. PCT/US15/051643, mailed on Dec. 17, 2015, 8 pages.
International Search Report and Written Opinion received for PCT Patent Application No. PCT/US2018/062864, mailed on Feb. 8, 2019, 14 pages.
"International Coral Reef Initiative,""What are Corals"", downloaded from http://www.iciforum.org/about-on Sep. 5, 2017."
Agnihotri, Shekar, et al., "Immobilized silver nanoparticles enhance contact killing and show highest efficacy: elucidation of the mechanism of bacterial action of silver," Nanoscale, 2013. published Jan. 3, 2013. (Year: 2013).
Badawy et al., "Surface Charge-Dependent Toxicity of Silver Nanoparticles", Environ. Sci. Technol. 2011, 45, 283-287.
Barcikowski et al., "Generation of nanoparticle colloids by picosecond and femtosecond laser ablations in liquid flow", Appl. Phys. Lett. 91, 083113 (2007).
Chien et al., "Synthesis of nanoparticles: sunlight formation of gold nanodecahedra for ultra-sensitive lead-ion detection", Green Chem., vol. 13, pp. 1162-1166, May 2011.
Choudhury et al. "A highly reversible room-temperature lithium metal battery based on crosslinked hairy nanoparticles", Nature Communications, 2015; DOI: 10.1038/ncomms10101.
Correard et al.,"Gold nanoparticles prepared by laser ablation in aqueous biocompatible solutions: assessment of safety and biological identity for nanomedicine applications", International Journal of Nanomedicine, Nov. 21, 2014; pp. 5415-5430.
Cox (https://microbiologysociety.org/blog/rabies-virus-can-we-treat-the-untreatable.html) Jun. 25, 2019, pp. 1-4 (Year: 2019).
Daissy Paredes, et al., "Synthesis, characterization, and evaluation of antibacterial effect of Ag nanoparticles against *Escherichia coli* 0157:h7 and methicillin-resistant *Staphylococcus aureus* (Mrsa)", Apr. 3, 2014, International Journal of Nanomedicine, p. 1717-1729.
Examiner Interview Summary received for U.S. Appl. No. 16/202,078, mailed on Nov. 6, 2020, 3 pages.
Gogoi et al. (Langmuir 2006;22:9322-9328) (Year: 2006).
Guangnian Xu, et al."Progress in preparation of nano-silver", 2019, Materials Review, vol. 24, No. 11, p. 139-142.
Gui, M. et al. "Cryo-electron microscopy structures of the SARS-CoV spike glycoprotein reveal a prerequisite conformational state for receptor binding" Cell Research (2017) 27:119-129 (Year: 2017).
Gurevitch et al. "Nanocomposites of Titanium Dioxide and Polystyrene-Poly(ethylene oxide) Block Copolymer as Solid-State Electrolytes for Lithium Metal Batteries", Journal of The Electrochemical Society, 2013; 160(9): A1611-A1617.
Hamada et al., Espacenet machine translation for JP 2006-351465 A (Year: 2006).
Hamm et al. "Ionic conductivity enhancement of sputtered gold nanoparticle-in-ionic liquid electrolytes", J Mater Chem A, 2014; 2(3): 792-803.
He et al. "Ionic liquid and nanoparticle hybrid systems: Emerging applications", 2017. Advances in Colloid and Interface Science, 2017; 244: 54-70.
Hopp Bela et al, "Production of nanostructures on bulk metal samples by laser ablation for fabrication of low-reflective surfaces", applied physics a materials science & processing, Springer Berlin Heidelberg, vol. 113, No. 2, Aug. 14, 2013, pp. 291-296.
Hultin, "A Guide to Solvents and Reagents in Introductory Organic Chemistry for students in 2.222", Obtained from https://home.cc.umanitoba.ca/-hultin/chem2220/Support/solvents_and_reagen-ts.pdf on Jan. 25, 2018, originally published Feb. 12, 2002—17 pages.
International Coral Reef Initiative, "What are Corals", downloaded from http://www.iciforum.org/about-coral-reefs/what-are-corals on Sep. 5, 2017.
International Search Report and Written Opinion received for PCT Patent Application No. PCT/US2020/041796, mailed on Oct. 7, 2020, 9 pages.
International Search Report and Written Opinion received for PCT Patent Application No. PCT/US22/71448, mailed on Jun. 7, 2022, 9 pages.
International Search Report cited in PCT/US18/62864 dated Nov. 28, 2018.
International Search Report for PCT App. No. PCT/US2012/044907 dated Jan. 31, 2013.
International Search Report for PCT App. No. PCT/US2015/051638 dated Jan. 29, 2016.
International Search Report for PCT App. No. PCT/US2015/051639 dated Dec. 17, 2015.
International Search Report for PCT App. No. PCT/US2015/051640 dated Dec. 17, 2015.

(56) References Cited

OTHER PUBLICATIONS

International Search Report for PCT App. No. PCT/US2015/051642 dated Dec. 14, 2015.
International Search Report for PCT App. No. PCT/US2015/051643 dated Dec. 17, 2015.
International Search Report for PCT App. No. PCT/US2015/051646 dated Dec. 18, 2015.
International Search Report for PCT App. No. PCT/US2015/051649 dated Dec. 17, 2015.
Jacobson, "These six diseases should worry you more than Ebola", Inside Energy Oct. 2014; [online] retrieved on Jan. 29, 2017 from http://www.pbs.org/newshour/updates/six-diseases-actually-worry/; 10 pages.
Jacobson, R. Inside Energy Oct. 2014; [online] retrieved on Jan. 29, 2017 from: http://www.pbs.org/newshour/updates/six-diseases-actually-worry/; 10 pages.
Jana et al., "Seeding Growth for Size Control of 5-40 nm Diameter Gold Nanoparticles", Langmuir 2001, 17, 6782-6786.
Kewal K. Jain MD, FRACS, FFPM., "The Handbook of Nanomedicine" Humana Press, 2008.
Korf et al. "Piperidine tethered nanoparticle-hybrid electrolyte for lithium metal batteries", J Mater. Chem., 2014; 2: 11866-11873.
Kozawa et al., Espacenet machine translation for JP 2007-109618A (Year: 2007).
Leisure Pro, "Coral Identification: Types of Coral (Part 1—Hard Coral)", downloaded from http://www.leisurepro.com/blog/explorethe- blue/coral-identification-types-of-coral-part-1 on Sep. 2017.
Liu et al., "A novel coral-like porous Sn02 hollow architecture: biomimetic swalloing growth mechanism and enhanced photovoltaic property for dye-sensitized solar cell application", Chem. Commun., vol. 46, pp. 472-474,2010.
Lu et al. "Ionic-Liquid-Nanoparticle Hybrid Electrolytes: Applications in Lithium Metal Batteries", Angew. Chem. Int. Ed., 2014; 53: 488-492.
Mafune et al., "Formation of Stable Platinum Nanoparticles by Laser Ablation in Water", J. Phys. Chem. B 2003, 107, 4218-4223.
Malvern, "The use of the Malvern Zetasizer for the measurement of Zeta Potential", article from the Internet, http://www.malvern.co.alLaboratory/zetaintm.htm> 10 pages, printed on Feb. 12, 2002.
Malvern, "Zeta Potential Theory, Dispersion stability", article from the Internet, http://www.malvern.co.uk/Laboratory/zettheo.htm >, 3 pages, printed on Feb. 12, 2002.
Muller, M. "Bacterial Silver Resistance Gained by Cooperative Interspecies Redox Behavior" Antimicrobial Agents and Chemotherapy 2018, 62 (8), 1-10 (Year: 2018).
Mycozil, "The Benefits of Colloidal Silver for Toenail Fungus", http://www.nailfungustoenail.com/benefitsofcolloidalsilverfortoenailfungu- s.html.
Naftulin (https://www.sciencealert.com/a-deadly-fungus-is-spreading-across-the-world-and-we-don-t-know-how-to-stop-it) Apr. 9, 2019, pp. 1-4 (Year: 2019).
Nakashima et al. "Preparation of fusion materials based on ionic liquids and cationic gold nanoparticles", Polymer Journal, 2015; 47: 171-176.
NOAA Ocean Service Education, "Corals", downloaded from https://oceanservice.noaa.gov/education/kits/corals/coral03_growth.html on Sep. 5, 2017.
Pal et al., "Does the Antibacterial Activity of Silver Nanoparticles Depend on the Shape of the Nanoparticle?", Applied and Environmental Microbiology, 2007; 73(6): 1712-1720.
Pan et al. "Hybrid Electrolytes with Controlled Network Structures for Lithium Metal Batteries", Adv. Mater., 2015; 27: 5995-6001.
International Search Report and Written Opinion received for PCT Patent Application No. PCT/US2022/040783, mailed on Nov. 8, 2022, 10 pages.
Prabhu, S, et al. "Silver nanoparticles: machanism of antimicrobial action, synthesis, medical applications, and toxicity effects" International Nano Letters 2012, 2:32 (Year: 2012).
Sahu et al., "Flower Shaped Silver Nanostructures: An Efficient Bacteria Exterminator", A Search for Antibacterial Agents; Chapter 2; [online] retrieved from: http://www.intechopen.com/books/a-search-forantibacterial-agents; 2007 73(6): 1712-1720 (Year: 2007).
Xu et al., "Comparison of sizing small particles using different technologies", Powder Technology, vol. 132, Feb. 10, 2003, pp. 145-153.
Yeh C-H. et al., "Physical and electrochemical characterization of PbO2 electrode prepared at different H2S04/H20/Pb0 ratios", Journal of Power Sources IOI, Jan. 31, 2001, pp. 219-225.

\* cited by examiner

NANOPARTICLE-ENHANCED LEAD-ACID ELECTRODE PASTE AND IMPROVED LEAD-ACID BATTERIES MADE THEREFROM

CROSS-REFERENCE TO RELATED APPLICATIONS

This application is a continuation in part of International Application No. PCT/US22/71448, filed Mar. 30, 2022, and a continuation-in-part of U.S. Pat. App. No. 17/216,996, filed Mar. 30, 2021, now U.S. Pat. No. 11,646,453, and claims the benefit of U.S. Prov. App. No. 63/197,605, filed Jun. 7, 2021. The foregoing applications are incorporated by reference in their entireties.

BACKGROUND

Lead-acid batteries are the most common type of rechargeable battery in the field of motor vehicle batteries. Although lead-acid batteries often have lower energy density compared to newer battery technologies, their ability to provide relatively large surge currents make them effective for powering automobile starter motors. Lead-acid batteries are also relatively inexpensive compared to newer battery technologies, making them an attractive choice for providing rechargeable power even in circumstances outside the motor vehicle field, such as power storage for houses and buildings and stationary power generally.

A lead-acid battery in a charged state includes a "negative electrode" or "anode" made of ground state lead (Pb), a "positive electrode" or "cathode" made of lead dioxide (PbO$_2$), and an electrolyte containing aqueous sulfuric acid (H$_2$SO$_4$). During discharge, ground state lead from the negative electrode is oxidized to form lead ions (Pb$^{2+}$), which react with sulfate ions from the sulfuric acid to form lead sulfate (PbSO$_4$), with the reaction producing 2 electrons (e). In the other half redox reaction, lead dioxide (Pb$^{4+}$) from the positive electrode is reduced by protons (H$^+$) from the sulfuric acid to form lead ions (Pb$^{2+}$), which react with sulfate ions from the sulfuric acid to form lead sulfate. Water is also produced from hydrogen ions (H$^+$) of the acid and oxide ions (O$^{-2}$) from the lead dioxide, forming a more dilute sulfuric acid electrolyte in a discharged state. This reduces the specific gravity of the electrolyte. Over time and/or when the battery is more fully discharged, excessive amounts of lead sulfate can precipitate onto the electrode plates, insulating them and reducing the ability of the battery to efficiently discharge and be recharged.

When a newer battery is recharged, solid lead sulfate formed on the positive electrode plates during discharge reverts back to ground state lead (Pb$^{2+}$ is reduced to Pb at the positive electrode plates), solid lead sulfate formed on the negative electrode plates during discharge reverts back to lead oxide (Pb$^{2+}$ is oxidized to Pb$^{4+}$ and combined with oxide ions to form PbO$_2$) at the negative electrode plates), and sulfuric acid is regenerated from protons (H$^+$) and sulfate ions (SO$_4^{2-}$) to form the electrolyte. Water is split, with oxide ions (O$^{-2}$) being incorporated into the lead dioxide (PbO$_2$) at the negative electrode and hydrogen ions (H$^+$) combining with sulfate ions (SO$_4^{2-}$) to regenerate sulfuric acid (H$_2$SO$_4$) in the electrolyte.

However, lead-acid batteries will, over time, lose the ability to be recharged as a result of excessive sulfation at and/or degradation of the electrode plates. Through multiple cycles of charge and discharge, some of the lead sulfate on the electrode plates will begin to form harder and more stable crystals covering the plates. Over time, progressive buildup of hard lead sulfate crystals on the plates increases internal resistance of the battery cell, and less and less of the surface area of the plates is available for supplying current and accepting a charge. Eventually, so much of the battery capacity is reduced that the battery is considered "dead" and must be replaced.

SUMMARY

It has now been found that incorporating metal (e.g., ground state gold) nanoparticles formed by laser ablation into the paste that is applied to at least some portion of the electrodes of a lead-acid battery greatly improves performance of the battery, including improved charge density per unit size or weight, improved stability, and improved longevity.

Improved electrode pastes containing metal (e.g., gold) nanoparticles as disclosed herein have improved charge transfer efficiency, physical integrity, long-term stability, and resistance to lead sulfate crystal formation on or in the electrode paste as well as improved electrode efficiency and stability and compared to conventional electrode pastes made without the metal nanoparticles and batteries made therefrom. Metal nanoparticles optionally included in the electrolyte can further improve the electrode paste and battery by further reducing deleterious buildup of crystalline PbSO$_4$ in the electrode paste and/or electrode surfaces.

In some embodiments, an improved electrode paste for use in manufacturing lead-acid batteries comprises: a carrier, one or more of lead (II) sulfate monobasic (PbO·PbSO$_4$), lead (II) sulfate dibasic (2PbO·PbSO$_4$), lead (II) sulfate tribasic (3PbO·PbSO$_4$), or lead (II) sulfate tetrabasic (4PbO·PbSO$_4$), and ground state metal nanoparticles, such as gold nanoparticles. In some embodiments, the carrier includes a binder, such as a polymer binder. The carrier may include one or more of sulfuric acid, water, or carbon black. In some embodiments, the metal nanoparticles can be included at a concentration in a range of about 100 ppb up to about 100 ppm, about 50 ppm, about 25 ppm, about 10 ppm, about 5 ppm, or about 2 ppm by weight of the electrode paste.

In some embodiments, an improved lead-acid battery comprises: a plurality of positive electrode plates comprising lead (IV) oxide (PbO$_2$); a plurality of negative electrode plates comprising ground state lead (Pb); and electrode paste on at least some and/or a portion of the positive and/or negative electrode plates, the electrode paste comprising a carrier, one or more of lead (II) sulfate monobasic (PbO·PbSO$_4$), lead (II) sulfate dibasic (2PbO·PbSO$_4$), lead (II) sulfate tribasic (3PbO·PbSO$_4$), or lead (II) sulfate tetrabasic (4PbO·PbSO$_4$), and ground state gold nanoparticles, wherein the carrier may include a binder, such as a polymer binder, and one or more of sulfuric acid, water, or carbon black.

In some embodiments, a method of manufacturing an improved lead-acid battery comprises: (1) providing an electrode paste comprising a carrier, one or more of lead (II) sulfate monobasic (PbO·PbSO$_4$), lead (II) sulfate dibasic (2PbO·PbSO$_4$), lead (II) sulfate tribasic (3PbO·PbSO$_4$), or lead (II) sulfate tetrabasic (4PbO·PbSO$_4$), and ground state gold nanoparticles, wherein the carrier may include a binder, such as a polymer binder, and one or more of sulfuric acid, water, or carbon black; (2) applying the electrode paste to at least some and/or at least a portion of the positive electrode plates comprising lead (IV) oxide (PbO$_2$) and/or at least some and/or at least a portion of the negative electrode plates comprising ground state lead)($Pb^0$); (4) positioning the positive and negative electrode plates within an electrically insulated container; (5) positioning separators between pairs of positive and negative electrode plates; and (6) placing an electrolyte comprising aqueous sulfuric acid inside the insulated container in contact with the positive and negative electrode plates.

In general, electrode pastes that contain a higher percentage of PbO relative to $PbSO_4$ (to be more basic) improve battery performance. In some embodiments, a majority of basic lead (II) sulfate compounds in the electrode paste comprise one or more of lead (II) sulfate dibasic ($2PbO \cdot PbSO_4$), lead (II) sulfate tribasic ($3PbO \cdot PbSO_4$), or lead (II) sulfate tetrabasic ($4PbO \cdot PbSO_4$). More preferably, a majority of basic lead (II) sulfate compounds in the electrode paste comprise one or more of lead (II) sulfate tribasic ($3PbO \cdot PbSO_4$) or lead (II) sulfate tetrabasic ($4PbO \cdot PbSO_4$). Even more preferably, a majority of basic lead (II) sulfate compounds in the electrode paste comprise lead (II) sulfate tetrabasic ($4PbO \cdot PbSO_4$).

In some embodiments, metal nanoparticles (e.g., gold nanoparticles) formed by laser ablation can optionally be added to or included within the electrolyte, either before, during, or after manufacture of the lead-acid battery. When included, the concentration of metal nanoparticles in the electrolyte can be least about 100 ppb and up to about 100 ppm, about 50 ppm, about 25 ppm, about 10 ppm, about 5 ppm, or about 2 ppm by weight of the electrolyte.

The improved lead-acid batteries disclosed herein have one or more of the following characteristics compared to a conventional lead acid battery that does not include metal nanoparticles formed by laser ablation in the electrode paste: increased fully charged resting voltage, increased partially discharged voltage, increased cranking amps, increased cold cranking amps, increased reserve capacity, increased battery stability, and/or increased battery lifespan.

In some embodiments, metal nanoparticles optionally added to or included with the electrolyte can migrate to and/or into the electrode paste on the battery electrode plates, thereby augmenting the quantity of metal nanoparticles already in the electrode paste. In some cases, a binder, such as a polymer binder, is added to or included in the paste to help stabilize the compounds in the paste.

In preferred embodiments, the metal nanoparticles are formed by laser ablation and comprise gold nanoparticles. Some embodiments may additionally or alternatively include metal nanoparticles formed by laser ablation from one or more alloys of any combination of gold, silver, platinum, and first row transition metals. The metal nanoparticles can be spherical-shaped and/or coral-shaped. Spherical-shaped nanoparticles are preferred and are characterized as being spherical in shape and free of external bond angles and not hedron-shaped. Coral-shaped nanoparticles are characterized as having a non-uniform cross section, a smooth surface, and a globular structure formed by multiple, non-linear strands joined together without right angles, with no edges or corners resulting from joining of separate planes and not hedron-shaped.

Spherical-shaped nanoparticles can be smaller than about 20 nm in diameter, preferably smaller than about 15 nm in diameter, more preferably smaller than about 10 nm in diameter, and most preferably smaller than about 7 nm in diameter (e.g., about 4 nm in diameter). In some embodiments, the mean diameter of spherical-shaped nanoparticles can be less than about 20 nm, preferably less than about 15 nm, more preferably less than about 10 nm, and most preferably less than about 7 nm (e.g., about 4 nm).

Coral-shaped nanoparticles typically have a mean length of less than about 100 nm, preferably less than about 80 nm, more preferably less than about 60 nm, and most preferably less than about 40 nm. Coral-shaped nanoparticles can have a mean length ranging from about 25 nm to about 80 nm.

Both spherical- and coral-shaped metal nanoparticles can be formed by laser ablation, in contrast to chemical synthesis, to produce nanoparticles having a smooth surface with no external bond angles or edges, as opposed to a hedron-like or crystalline shape nanoparticles made by conventional chemical processes. The metal nanoparticles can be free of capping agents and not bound to any organic molecules (e.g., can be "naked" metal nanoparticles of essentially pure metal). In some embodiments, the nanoparticles have a narrow particle size distribution, wherein at least about 99% of the nanoparticles are within 30%, 20%, or 10% of the mean diameter in the case of spherical-shaped nanoparticles or mean length in the case of coral-shaped nanoparticles.

Additional features and advantages will be set forth in part in the description that follows, and in part will be obvious from the description, or may be learned by practice of the embodiments disclosed herein.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings, in which.

DETAILED DESCRIPTION

Introduction

Figure 1A:
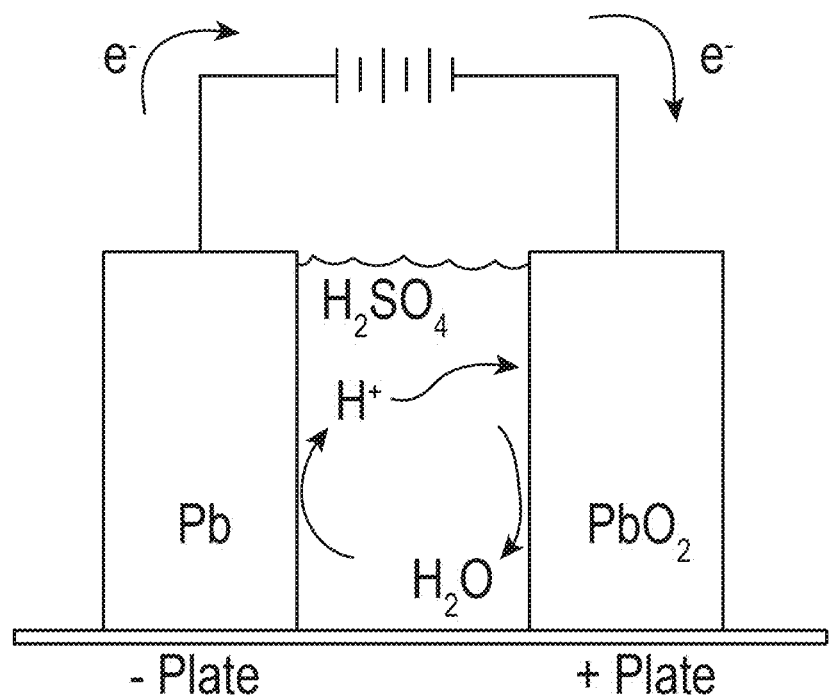
FIGS. 1A and 1B illustrate a lead-acid battery cell in a charged/discharging and discharged state, respectively.

Disclosed herein are improved electrode pastes for use in manufacturing lead-acid batteries, improved lead-acid batteries made therefrom, and methods for manufacturing improved lead-acid batteries. Improved lead-acid batteries disclosed herein have one or more of the following characteristics compared to a conventional lead acid battery that does not include metal nanoparticles formed by laser ablation in the electrode paste: increased charge density, increased fully charged resting voltage, increased partially discharged voltage, increased cranking amps, increased cold cranking amps, increased reserve capacity, increased stability, and increased battery lifespan.

Including ground state metal (e.g., gold) nanoparticles in the electrode paste, and optionally the electrolyte, of a lead-acid battery improves performance for various reasons. In one aspect, the metal nanoparticles form nucleation sites that promote formation of smaller lead sulfate ($PbSO_4$) crystals compared to lead sulfate crystals formed in conventional lead-acid batteries. The smaller lead sulfate crystals are softer, more stable, and more porous than lead sulfate crystals formed in conventional lead-acid batteries. The inclusion of metal nanoparticles in the electrode paste improves stability and efficiency of the paste and, in turn, reduces corrosion of the battery electrodes. In some embodiments, inclusion of metal nanoparticles in the electrode paste can increase the effective capacitance by up to 700% compared to conventional batteries that omit the metal nanoparticles in the paste. Compared to existing nanoparticle systems that merely increase conductivity of the electrolyte, the inclusion of ground state metal nanoparticles in the electrode paste increases the reactivity of electroactive species in the lead-acid battery.

The improved performance of lead-acid batteries made using an electrode paste comprising lead (II) oxide-sulfate compounds, sulfuric acid, and metal nanoparticles facilitates the design of new battery types that can be reduced in size yet have the same or increased charge density. This permits the manufacture of batteries that are not overdesigned (i.e., too large and/or too expensive) to avoid typical performance problems. The metal nanoparticles enhance the activity of electroactive species in the battery. The metal nanoparticles are unique in that they have allotropic surfaces, which are stronger than metal nanoparticles forming using chemical means.

The resulting lead-acid batteries have greater consistency of performance. Including the metal nanoparticles in the electrode paste greatly improves battery performance without having to subject the battery to multiple charge ad discharge cycles to incorporate nanoparticles into the paste, as required when only adding metal nanoparticles to the electrolyte.

Overview of Lead-Acid Batteries

A lead-acid battery includes "negative" electrode plates made from and/or that include ground state lead ($Pb^0$) on at least the surface of the electrodes and "positive" electrode plates made from and/or that include lead (IV) dioxide ($PbO_2$) on at least the surface of the electrodes. The electrode plates are arranged in a battery case and bathed in an electrolyte comprising aqueous sulfuric acid.

During discharge, the negative electrode plates comprising ground state lead are the anode (i.e., because electrons are generated and flow out) and the positive electrode plates comprising lead dioxide are the cathode (i.e., because electrons flow in and are consumed). During recharging, the negative electrode plates become the cathode (i.e., because electrons flow in and are consumed) and the positive electrode plates become the anode (i.e., because electrons are removed and flow out).

FIG. 1A illustrates a typical lead-acid battery cell in a charged/actively discharging state. At the negative electrode plate, the electrode consists essentially of ground state lead (Pb) and/or includes a lead coating, while at the positive electrode plate, the electrode consists essentially of lead (IV) oxide ($PbO_2$) and/or includes a $PbO_2$ coating. An electrolyte, typically of aqueous sulfuric acid ($H_2SO_4$), is in contact with the positive and negative electrode plates.

In a typical sulfuric acid electrolyte, the sulfuric acid provides hydrogen ions and soluble bisulfate ions, which are both consumed by redox reactions during discharge and, alternatively, are produced by redox reactions during recharge. Water is formed during discharge and consumed during recharge. When the circuit is closed, the oxidation reaction at the negative electrode plate generates electrons and hydrogen ions, and the lead (Pb) electrode converts to $PbSO_4$. The redox half reaction reaction at the negative electrode plate is shown below:

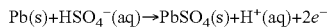

$$Pb(s)+HSO_4^-(aq) \rightarrow PbSO_4(s)+H^+(aq)+2e^-$$

At the positive electrode plate, the electrons and hydrogen ions combine with oxygen from the $PbO_2$ to form water, and the $PbO_2$ electrode converts to $PbSO_4$. The redox hald reaction at the positive electrode plate is shown below:

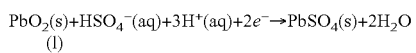

$$PbO_2(s)+HSO_4^-(aq)+3H^+(aq)+2e^- \rightarrow PbSO_4(s)+2H_2O \quad (1)$$

Because more protons are consumed than are produced during discharge, the electrolyte becomes less acidic, and thus more dilute, as water is generated at the positive plate from oxygen removed from lead dioxide and hydrogen ions from the sulfuric acid, and the cell moves toward the discharged state.

Figure 1B:
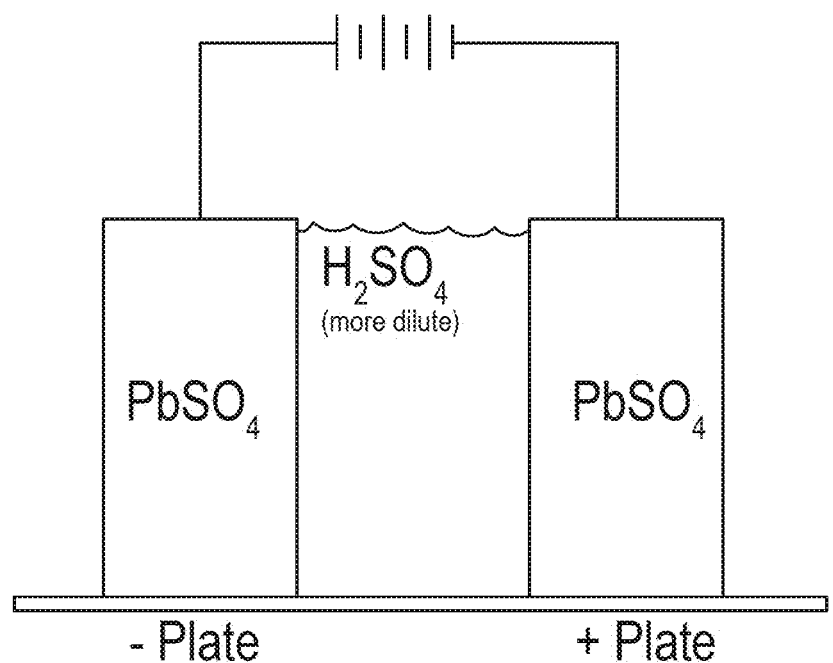

FIG. 1B illustrates the battery cell in the discharged state. As shown, both electrodes contain a greater proportion of precipitated $PbSO_4$ and the sulfuric acid is more dilute. Recharging the battery involves applying sufficient voltage to the electrolyte and running the circuit in the reverse of that shown in FIG. 1, thereby bringing the negative electrode plate toward a greater proportion of lead (Pb), the positive electrode plate toward a greater proportion of $PbO_2$, and causing the electrolyte to become less diluted with water and more concentrated with sulfuric acid. Hydrogen gas can be produced as a biproduct in an irreversible reaction that can negatively alter the balance of electroactive species.

Figure 2:
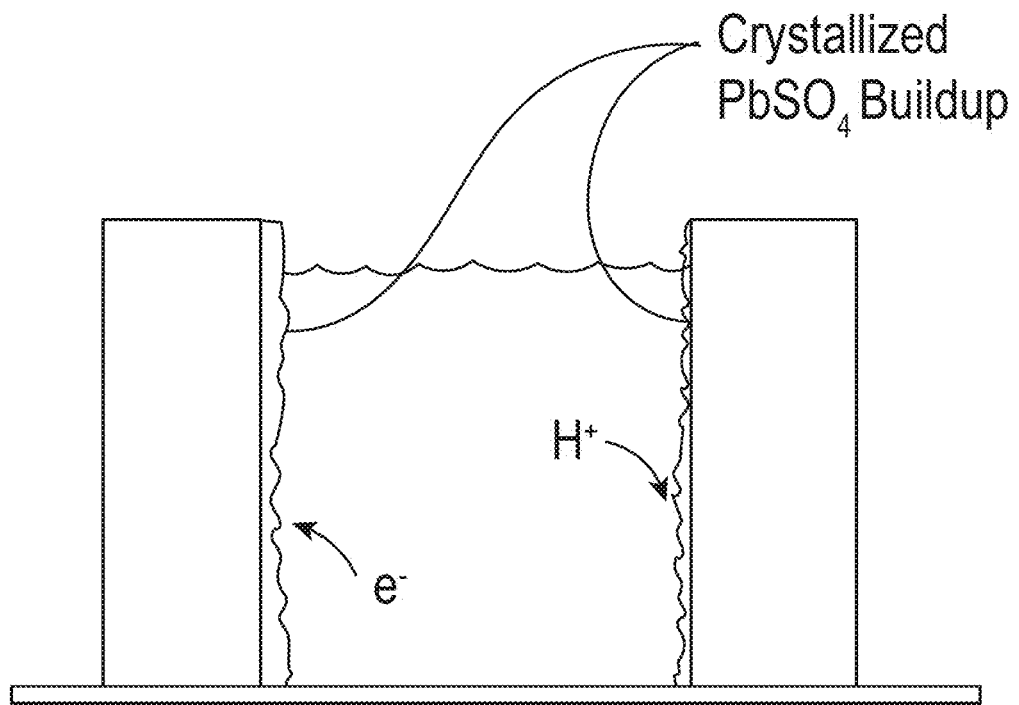
FIG. 2 illustrates a lead-acid battery cell showing buildup of crystallized precipitated $PbSO_4$ on electrode surfaces, which can at least partially block electrons or ions from passing to or from the electrodes.

FIG. 2 schematically illustrates the buildup of crystalline $PbSO_4$ on the electrode plates. In a newer battery, solid $PbSO_4$ formed on the electrode plates is more amorphous and can more easily revert back to lead, lead dioxide, and sulfuric acid as a voltage is applied and the battery is recharged. Through multiple cycles of charge and discharge, however, some of the $PbSO_4$ will not be recombined into the electrolyte and will begin to form a more stable, crystalline layer on the plates. Over time, lead sulfate buildup reduces the ability of electrons and ions to pass to and from the working electrode surfaces, increasing internal resistance of the battery cell and decreasing its capacity. Increased internal resistance can also increase formation of hydrogen gas during charging (e.g., because a higher voltage must be applied to charge at the same amperage). In addition, the buildup of a hard, stable crystalline form of $PbSO_4$ can eventually cause the plate to bend, making the battery take on the bulging shape associated with dead or highly depleted batteries.

Including Metal Nanoparticles in the Electrolyte

Figure 3:
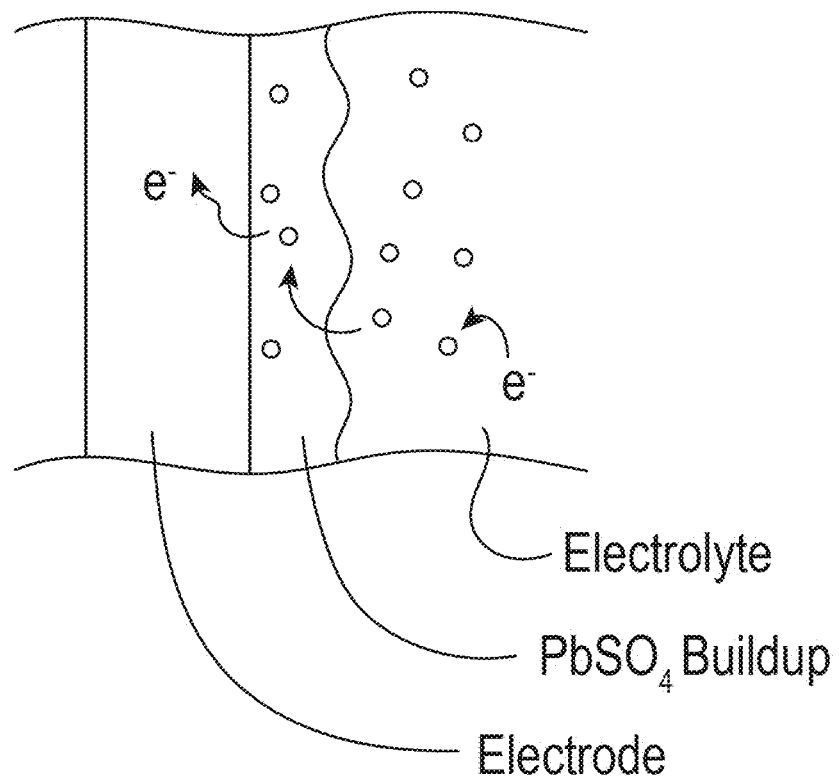
FIG. 3 illustrates a lead-acid battery cell having non-ionic, ground state, metal nanoparticles dispersed within the electrolyte for improving electron transport across the layer of crystallized $PbSO_4$ buildup at the anode during a recharge cycle.

FIG. 3 schematically illustrates a plurality of nonionic, ground state metal nanoparticles optionally included in the electrolyte of the lead-acid battery cell. Without wishing to be bound to any particular theory, it is postulated that a portion of the nanoparticles are able to move into the layer of crystalline $PbSO_4$ buildup and maintain open regions of the electrode plate where the buildup of crystalline $PbSO_4$ is prevented. The nanoparticles within the bulk electrolyte and within the layer of crystalline $PbSO_4$ buildup can also improve electron transport through or across the layer of the crystalline $PbSO_4$ buildup and to the working surface of the electrode plate. This improves the efficiency of discharge and recharge cycles.

Likewise, it is theorized that during recharging, the nanoparticles in the electrolyte potentiate the release of $SO_4^{2-}$ ions from solid $PbSO_4$ to reform $H_2SO_4$ in the electrolyte and cause or allow released lead to reform onto the electrode surfaces (i.e., as ground state lead at the negative electrode and lead (IV) oxide at the positive electrode). It is believed that the nanoparticles are able to bring about the dissolution of even stable, crystalline forms of $PbSO_4$ responsible for detrimental buildup and battery degradation. Thus, it is theorized that the nanoparticles in the electrolyte can both: (1) aid in electron transport through or across a crystalline $PbSO_4$ layer, and (2) aid in slowing or preventing the formation, or promoting the disassociation, of crystalline $PbSO_4$ deposits over time.

When included, the concentration of metal nanoparticles in the electrolyte can be least about 100 ppb and up to about 100 ppm, about 50 ppm, about 25 ppm, about 10 ppm, about 5 ppm, or about 2 ppm by weight of the electrolyte.

Including Metal Nanoparticles in the Electrode Paste

Instead of or in addition to adding metal nanoparticles to the electrolyte, it has now been found that improved lead-acid batteries can be manufactured by including the metal nanoparticles within the electrode paste itself, which is applied directly to electrode plates during manufacture. Electrode paste is typically applied to the electrodes during the manufacture or remanufacture of lead-acid batteries and is made by mixing lead (II) oxide (PbO) with sulfuric acid and water to form basic lead sulfate compounds, such as lead sulfate monobasic ($PbO \cdot PbSO_4$), lead sulfate dibasic ($2PbO \cdot PbSO_4$), lead sulfate tribasic ($3PbO \cdot PbSO_4$), and lead sulfate tetrabasic ($4PbO \cdot PbSO_4$). In some embodiments, a binder, such as a polymer binder (e.g., lignosulfonate), can be added to the paste.

FIGS. 4A-4G illustrate an example diagram of a sequence for making an improved lead-acid battery using the improved electrode pastes disclosed herein.

Figure 4A:
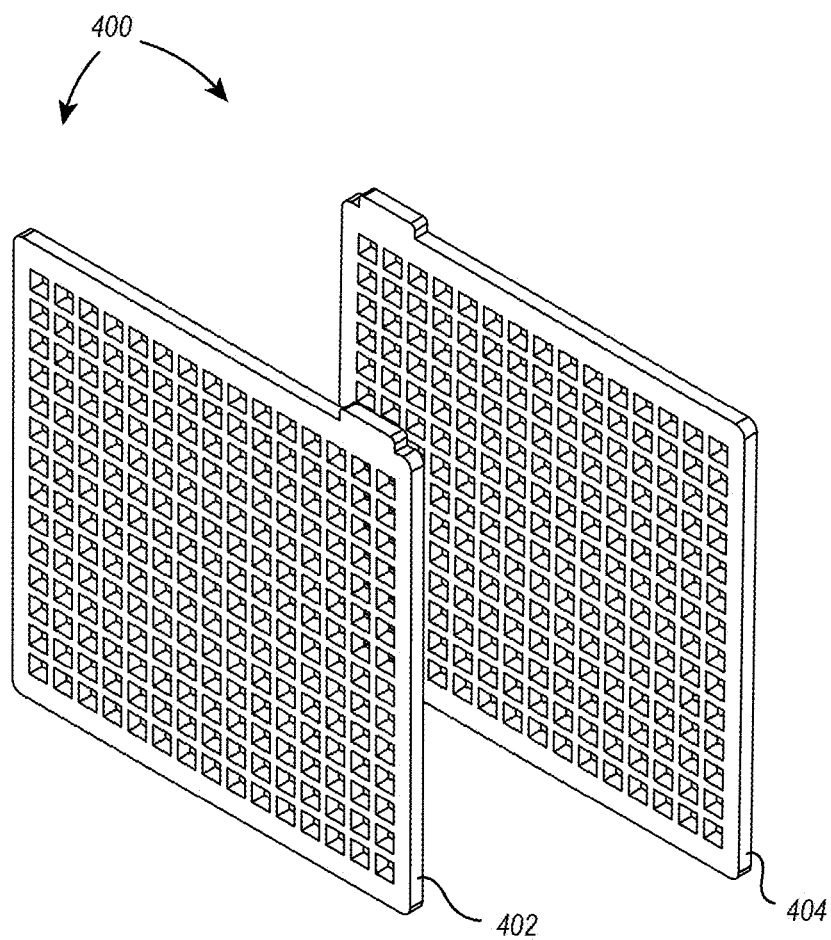
FIGS. 4A-4F illustrate an example sequence of manufacturing a lead-acid battery using an improved electrode paste as disclosed herein.

FIG. 4A illustrates example electrode grid plates 400, including negative electrode grid plate 402, comprising or coated with ground state lead ($Pb^0$), and positive electrode grid plate 404, comprising or coated with lead (IV) oxide ($PbO_2$).

Figure 4B:
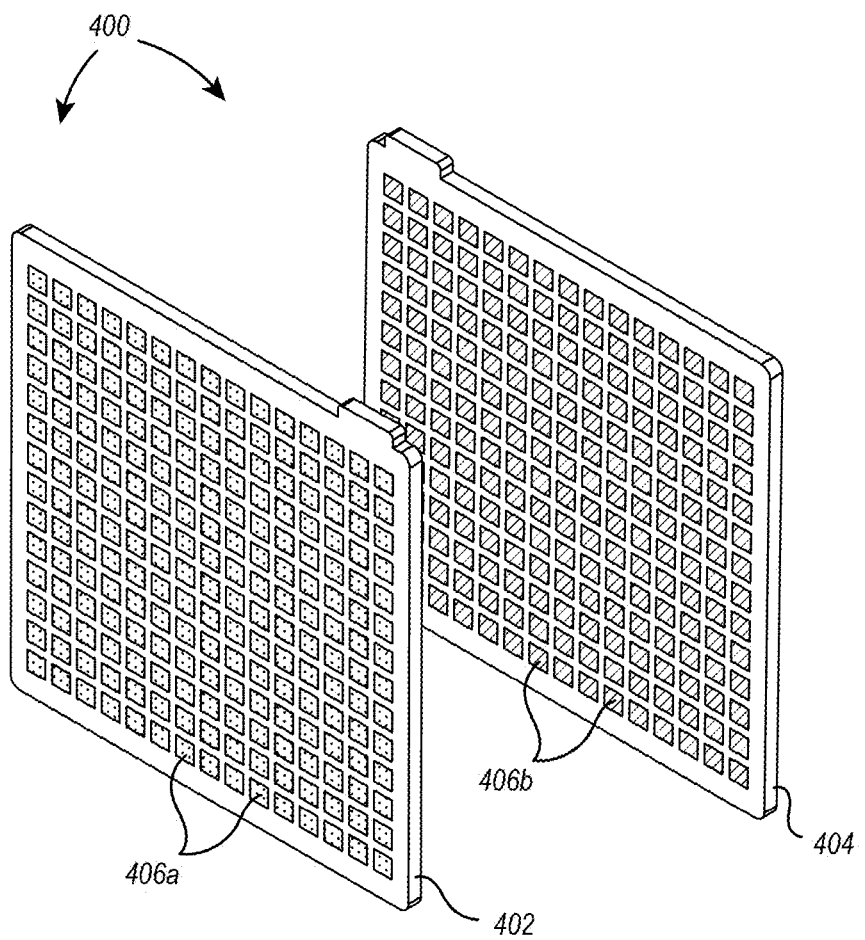

FIG. 4B illustrates example the electrode grid plates 400, including the negative electrode grid plate 402, which has been coated or impregnated with a first electrode paste 406a comprising basic lead sulfate and metal nanoparticles, and the positive electrode grid plate 404, which has been coated or impregnated with a second electrode paste 406b comprising basic lead sulfate and metal nanoparticles. The first and second electrode pastes 406a and 406b can be the same or different. For example, the first and second electrode pastes 406a and 406b may contain the same or different concentrations of metal nanoparticles and/or the same or different concentration and/or ratio of basic lead (II) sulfate compounds.

Figure 4C:
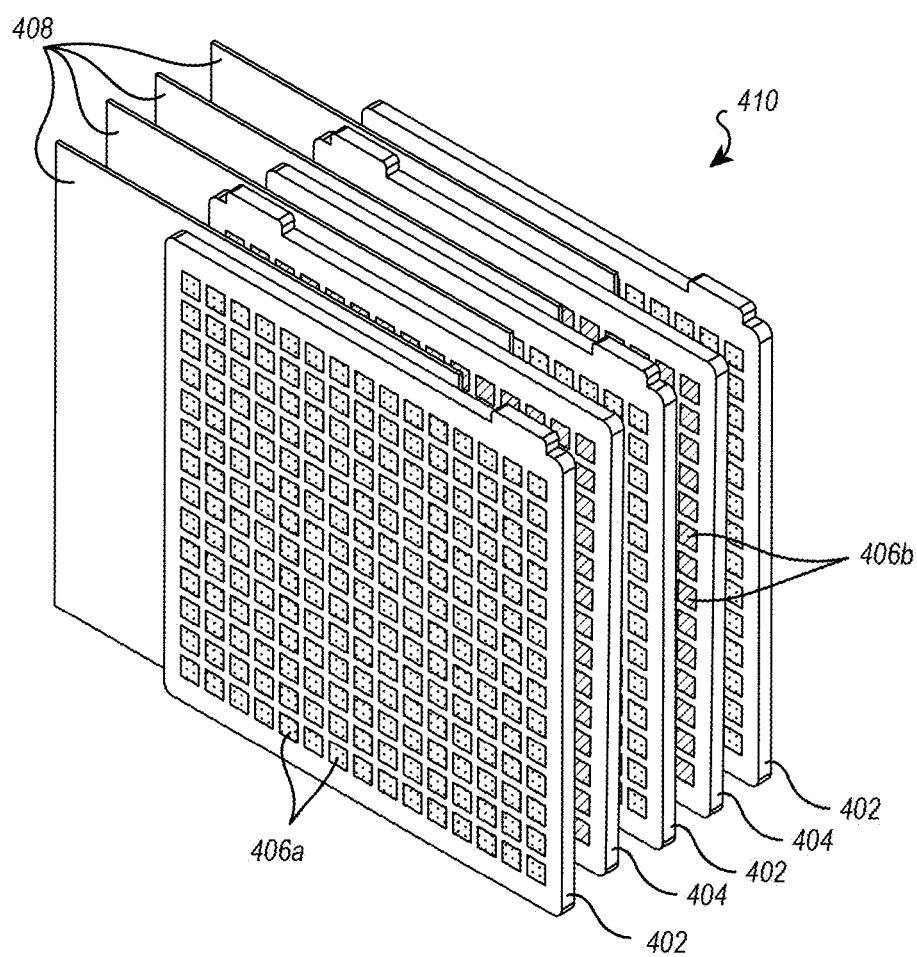

FIG. 4C illustrates the assembly of electrode grid plates to form an electrode cell assembly 410, including alternating placement of the negative electrode grid plates 402 and positive electrode grid plates 404, which have been coated or impregnated with first and second electrode pastes 406a, 406b, respectively. Porous separator layers 408 are positioned between the negative electrode grid plates 402 and positive electrode grid plates 404 to prevent contact and shorting of electrodes within the electrode cell assembly 410.

Figure 4D:
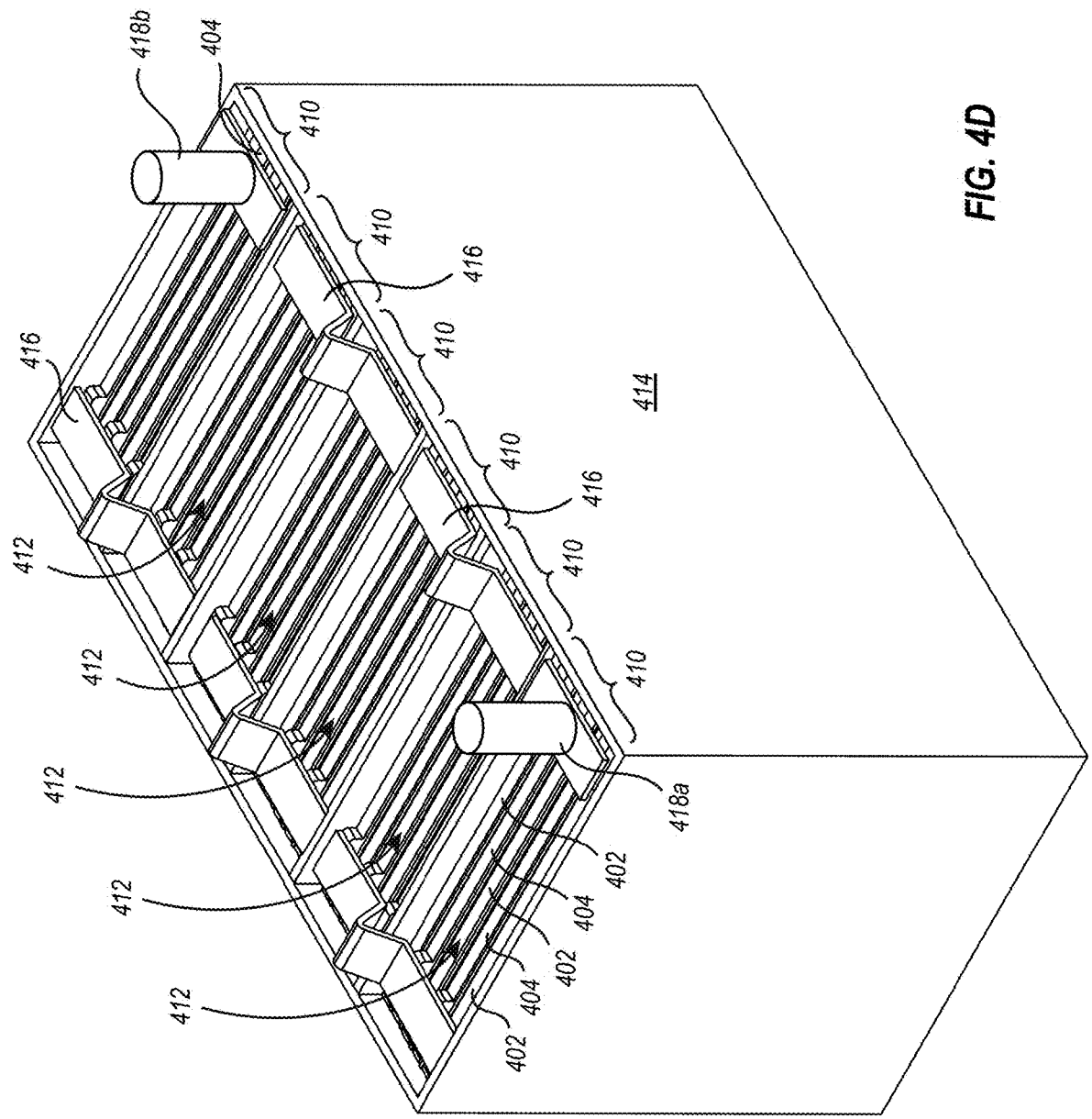

FIG. 4D illustrates six electrode cell assemblies 410 positioned within six respective compartments 412 of a battery casing 414 to form a 12 volt battery. The negative electrode grid plates 402 of each cell are electrically connected with the positive electrode grid plates 404 of an adjacent cell by connecting straps 416. A negative terminal 418a is electrically coupled to the negative electrode grid plates 402 via negative connection straps 416a. A positive terminal 418b is electrically coupled to the positive electrode grid plates 404 via positive connection straps 416b.

Figure 4E:
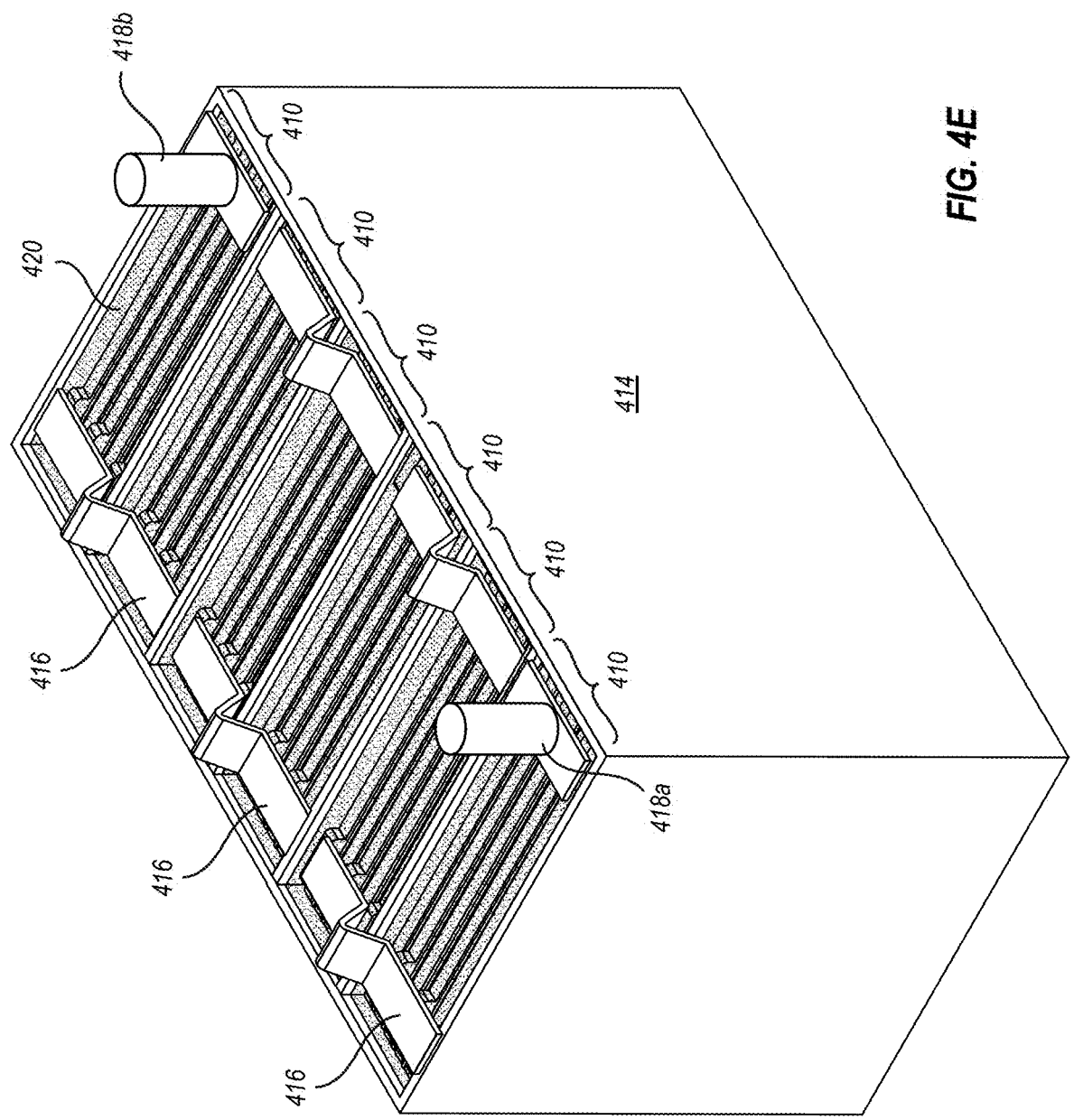

FIG. 4E illustrates an electrolyte 420 comprising a mixture of water and sulfuric acid having been added to each compartment 412 to cover the electrode plates 400 of each battery cell 410.

Figure 4F:
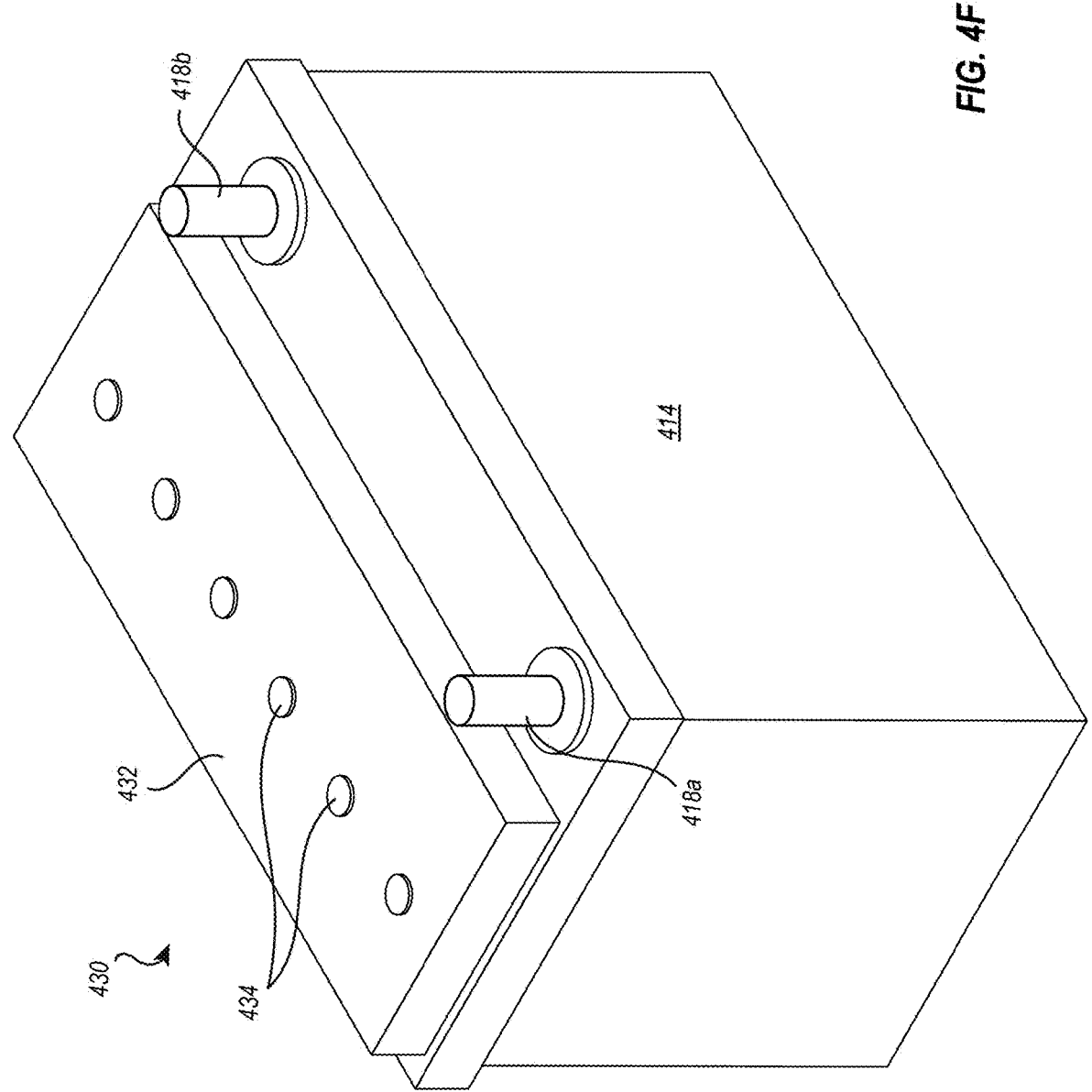

FIG. 4F illustrates a finished a battery 430 comprising a battery casing 414 housing the above-described battery components and battery cover 432 having safety vents 434 formed therein to release excessive gas buildup. Alternatively, the battery 430 can be a sealed battery without vents 434.

In some embodiments, the electrode paste includes a concentration of the metal nanoparticles in a range of about 100 ppb up to about 100 ppm, about 50 ppm, about 25 ppm, about 10 ppm, about 5 ppm, or about 2 ppm by weight of the electrode paste.

Lead-acid batteries manufactured using an electrode paste containing metal nanoparticles described herein were surprisingly and unexpectedly found to have increased charge density, increased fully charged resting voltage, increased partially discharged voltage, increased cranking amps, increased cold cranking amps, increased reserve capacity, increased stability, and increased battery life (e.g., able to withstand a greater number of discharge and recharge cycles before losing the ability to maintain a charge).

In some embodiments, the electrode paste can be made following conventional means, modified by also incorporating metal nanoparticles as disclosed herein. Nonlimiting examples of methods of manufacturing a conventional electrode paste are disclosed in WO 2005/094501 and U.S. Pat. No. 7,118,830, which are incorporated by reference.

Nanoparticle Configurations

Figure 6A:
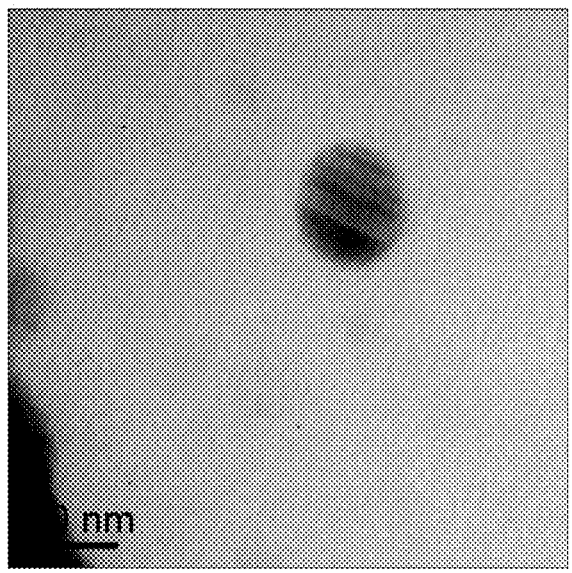
FIGS. 6A-6C show TEM images of exemplary spherical-shaped metal nanoparticles for use in electrode paste and/or electrolyte of a lead-acid battery.
Figure 6B:
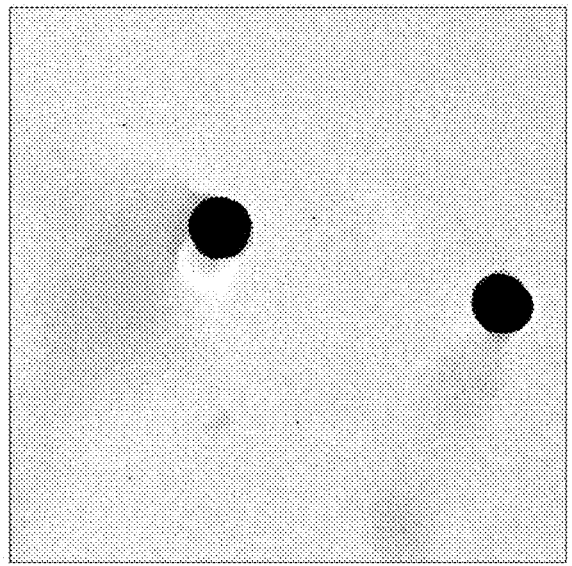
Figure 6C:
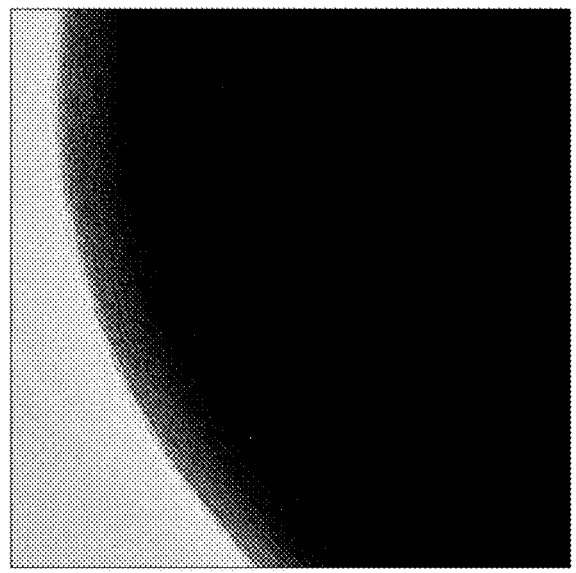

In some embodiments, the metal nanoparticles used to make improved electrode pastes are or include spherical-shaped nanoparticles (see FIGS. 6A-6C). As used herein, the spherical-shaped nanoparticles are not the same as typical hedron-like, multi-edged particles formed through conventional chemical synthesis methods. Rather, spherical-shaped nanoparticles are formed through a laser-ablation process that results in a smooth surface without edges or bond angles. Some patents that disclose nanoparticles formed by chemical processes uses the term "spherical" to encompass particles that are rounded but still have edge angles and are hedron-shaped.

Figure 5A:
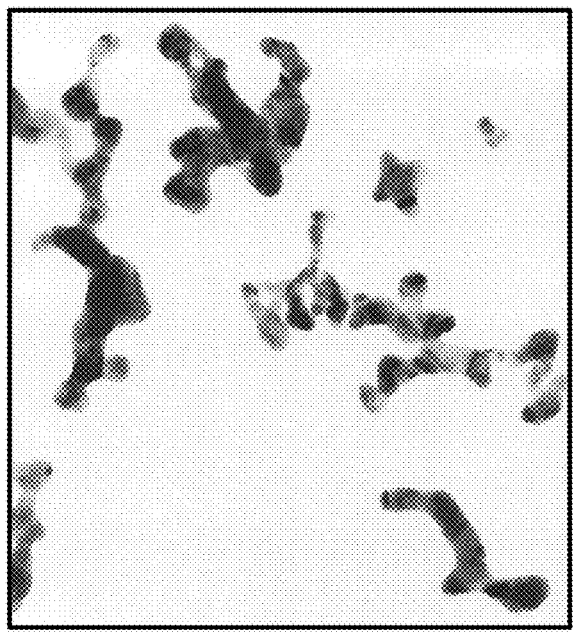
FIGS. 5A-5C show transmission electron microscope (TEM) images of coral-shaped nanoparticles for use in electrode paste and/or electrolyte of a lead-acid battery.
Figure 5B:
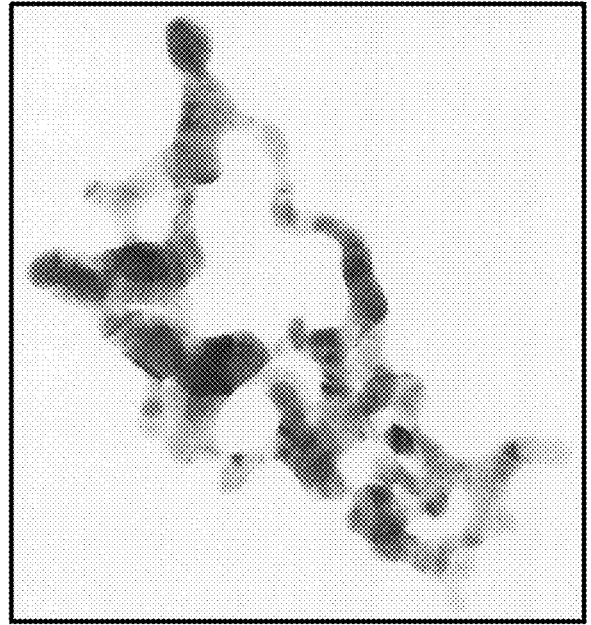
Figure 5C:
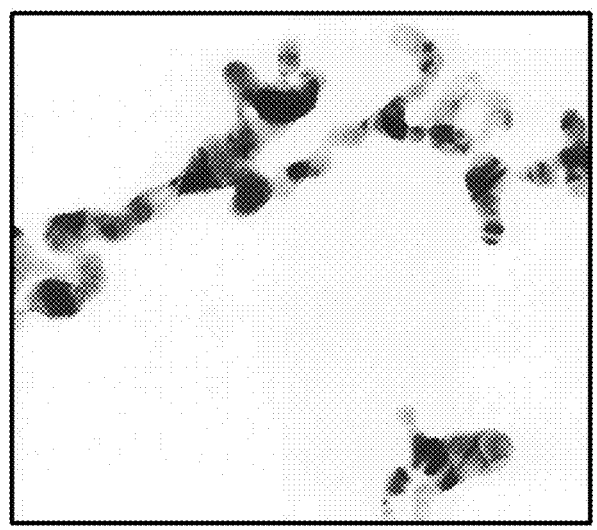

In some embodiments, the metal nanoparticles can include coral-shaped metal nanoparticles (see FIGS. 5A-5C). As used herein, the term "coral-shaped nanoparticles" refers to nanoparticles that have a non-uniform cross section, a smooth surface, and a globular structure formed by multiple, non-linear strands joined together without right angle and with no edges or corners resulting from joining of separate planes. This is in contrast to nanoparticles made through a conventional chemical synthesis method, which yields particles having a hedron-like shape with crystalline faces and edges, and which can agglomerate to form "flower-shaped" particles (see FIGS. 7A-7D). In other words, some publications refer to "nanoflowers", which are excluded from "coral-shaped" nanoparticles.

The relative smoothness of the surfaces of the spherical-and/or coral-shaped nanoparticles described herein beneficially enables the formation of very stable and highly effective electrode pastes. Such nanoparticles can be stored in solution (e.g., at room temperature) for months or even years (e.g., 1 to 2 years, up to 3 years or more, up to 5 years or more) with little to no agglomeration or degradation in particle size distribution.

The smooth, non-angular shape of the nanoparticles described herein yield smaller lead sulfate crystals that are softer, more stable, and more chemically reactive that large, hard sulfate crystals that form in conventional lead-acid batteries. The nanoparticles allow for beneficial positioning of the nanoparticles at plate grain boundaries that are sufficiently deep within the layer of $PbSO_4$ buildup.

Preferred embodiments utilize spherical-shaped, ground state gold nanoparticles (see FIGS. 6A-6C), though other materials may additionally or alternatively be utilized as well. For example, some embodiments may additionally or alternatively include nanoparticles formed from alloys of gold, silver, platinum, first row transition metals, or combinations thereof. Other exemplary metals are described below.

In some embodiments, the metal nanoparticles may comprise or consist essentially of nonionic, ground state metal nanoparticles. Examples include spherical-shaped metal nanoparticles, coral-shaped metal nanoparticles, or a blend of spherical-shaped metal nanoparticles and coral-shaped metal nanoparticles.

In some embodiments, nonionic metal nanoparticles useful for making nanoparticle compositions comprise coral-shaped nanoparticles (see FIGS. 5A-5C). The term "coral-shaped metal nanoparticles" refers to nanoparticles that are made from one or more metals, preferably nonionic, ground state metals having a non-uniform cross section and a globular structure formed by multiple, non-linear strands joined together without right angles. Similar to spherical-shaped nanoparticles, coral-shaped nanoparticles may only have internal bond angles and no external edges or bond angles. In this way, coral-shaped nanoparticles can be highly resistant to ionization, highly stable, and highly resistance to agglomeration. Such coral-shaped nanoparticles can exhibit a high $\xi$-potential, which permits the coral-shaped nanoparticles to remain dispersed within a polar solvent without a surfactant, which is a surprising and unexpected result.

In some embodiments, coral-shaped nanoparticles can have a mean length of less than about 100 nm, preferably less than about 80 nm, more preferably less than about 60 nm, and most preferably less than about 40 nm. Coral-shaped nanoparticles can have a mean length ranging from about 25 nm to about 80 nm. In other embodiments, coral-shaped nanoparticles can have lengths ranging from about 15 nm to about 100 nm, or about 20 nm to about 90 nm, or about 25 nm to about 80 nm, or about 30 nm to about 75 nm, or about 40 nm to about 70 nm.

In some embodiments, coral-shaped nanoparticles can have a particle size distribution such that at least 99% of the nanoparticles have a length within 30% of the mean length, or within 20% of the mean length, or within 10% of the mean length. In some embodiments, coral-shaped nanoparticles can have a $\xi$-potential of at least 10 mV, preferably at least about 15 mV, more preferably at least about 20 mV, even more preferably at least about 25 mV, and most preferably at least about 30 mV.

Examples of methods and systems for manufacturing coral-shaped nanoparticles through a laser-ablation process are disclosed in U.S. Pat. No. 9,919,363, which is incorporated herein by reference.

In some embodiments, metal nanoparticles useful for making nanoparticle compositions may also comprise spherical-shaped nanoparticles instead of, or in addition to, coral-shaped nanoparticles. FIGS. 6A-6C show transmission electron microscope (TEM) images of spherical-shaped nanoparticles utilized in embodiments of the present disclosure. FIG. 6A shows a gold/silver alloy nanoparticle (90% silver and 10% gold by molarity). FIG. 6B shows two spherical nanoparticles side by side to visually illustrate size similarity. FIG. 6C shows a surface of a metal nanoparticle showing the smooth and edgeless surface morphology.

Spherical-shaped metal nanoparticles made by laser ablation preferably have solid cores. The term "spherical-shaped metal nanoparticles" refers to nanoparticles that are made from one or more metals, preferably nonionic, ground state metals, having only internal bond angles and no external edges or bond angles. In this way, the spherical nanoparticles are highly resistant to ionization, highly stable, and highly resistance to agglomeration. Such nanoparticles can exhibit a high-potential, which permits the spherical nanoparticles to remain dispersed within a polar solvent without a surfactant, which is a surprising and unexpected result.

In some embodiments, spherical-shaped metal nanoparticles can have a diameter of about 40 nm or less, about 35 nm or less, about 30 nm or less, about 25 nm or less, about 20 nm or less, about 15 nm or less, about 10 nm or less, about 7.5 nm or less, or about 5 nm or less. Spherical-shaped nanoparticles can have a mean diameter of less than about 20 nm in diameter, preferably less than about 15 nm in diameter, more preferably less than about 10 nm in diameter, and most preferably less than about 7 nm in diameter.

In some embodiments, spherical-shaped nanoparticles can have a particle size distribution such that at least 99% of the nanoparticles have a diameter within 30% of the mean diameter of the nanoparticles, or within 20% of the mean diameter, or within 10% of the mean diameter. In some embodiments, spherical-shaped nanoparticles can have a mean particle size and at least 99% of the nanoparticles have a particle size that is within ±3 nm of the mean diameter, ±2 nm of the mean diameter, or ±1 nm of the mean diameter. In some embodiments, spherical-shaped nanoparticles can have a $\xi$-potential (measured as an absolute value) of at least 10 mV, preferably at least about 15 mV, more preferably at least about 20 mV, even more preferably at least about 25 mV, and most preferably at least about 30 mV.

Examples of methods and systems for manufacturing spherical-shaped nanoparticles through a laser-ablation process are disclosed in U.S. Pat. No. 9,849,512, incorporated herein by this reference.

The metal nanoparticles, including coral-shaped and/or spherical-shaped nanoparticles, may comprise any desired metal, mixture of metals, or metal alloy, including at least one of gold, silver, platinum, palladium, rhodium, osmium, ruthenium, rhodium, rhenium, molybdenum, copper, iron, nickel, tin, beryllium, cobalt, antimony, chromium, manganese, zirconium, tin, zinc, tungsten, titanium, vanadium, lanthanum, cerium, heterogeneous mixtures thereof, or alloys thereof.

In some embodiments, coral-shaped metal nanoparticles can be used together with spherical-shaped metal nanoparticles. In general, spherical-shaped metal nanoparticles can be smaller than coral-shaped metal nanoparticles and in this way can provide very high surface area for catalyzing desired reactions or providing other desired benefits. On the other hand, the generally larger coral-shaped nanoparticles can exhibit higher surface area per unit mass compared to spherical-shaped nanoparticles because coral-shaped nanoparticles have internal spaces and surfaces rather than a solid core and only an external surface. In some cases, providing nanoparticle compositions containing both coral-shaped and spherical-shaped nanoparticles can provide synergistic results. For example, coral-shaped nanoparticles can help carry and/or potentiate the activity of spherical-shaped nanoparticles in addition to providing their own unique benefits.

In some embodiments, a nanoparticle composition may comprise (1) a first set of metal nanoparticles having a specific particle size and particle size distribution, (2) and second set of metal nanoparticles having a specific particle size and particle size distribution, and (3) a carrier.

Figure 7A:
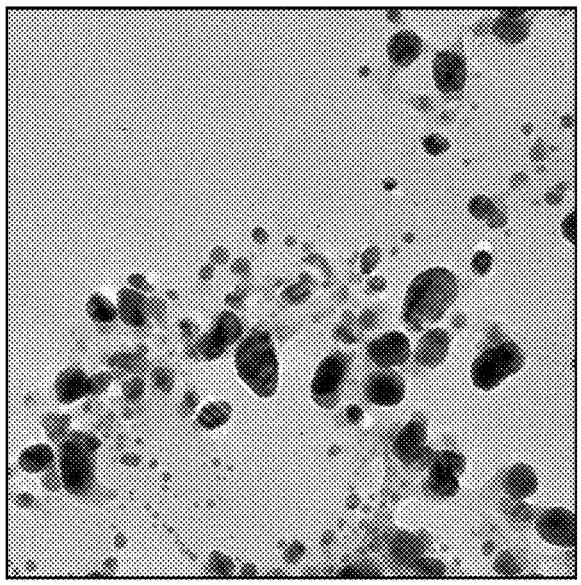
FIGS. 7A-7D show TEM images of various non-spherical nanoparticles that have surface edges and external bond angles made according to conventional chemical synthesis methods.
Figure 7B:
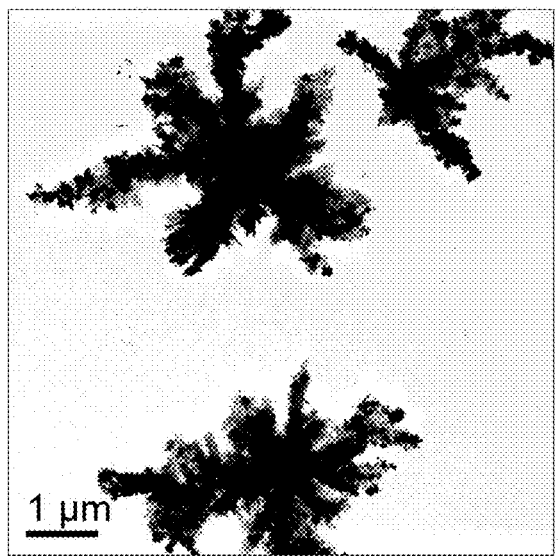
Figure 7C:
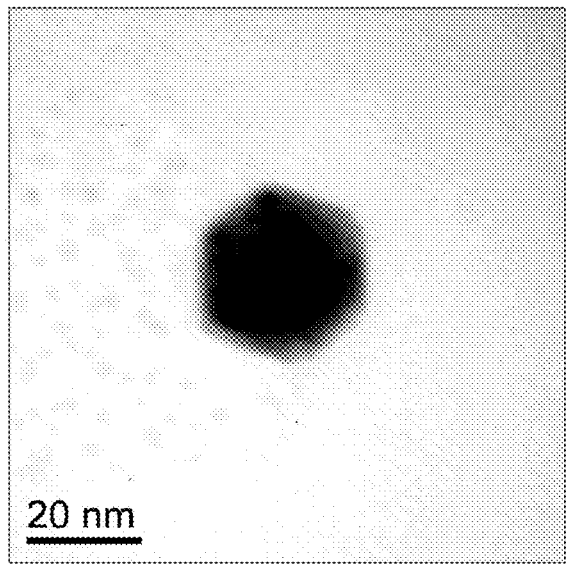
Figure 7D:
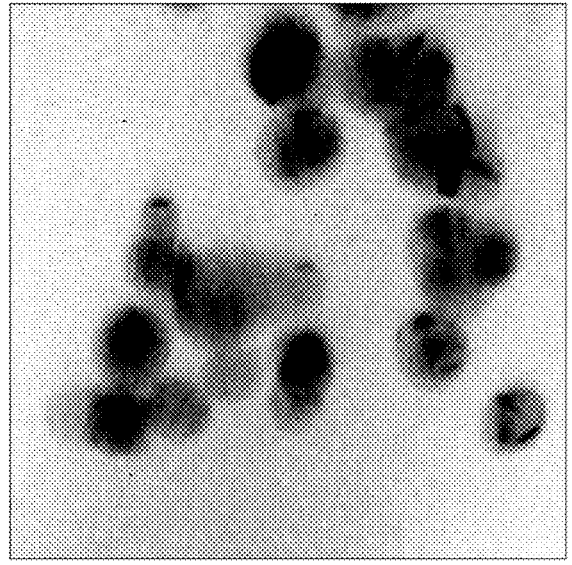

In contrast to coral-shaped and spherical-shaped nanoparticles as used herein, FIGS. 7A-7D show TEM images of nanoparticles made according to various chemical synthesis methods. As shown, the nanoparticles formed using these various chemical synthesis methods tend to exhibit a clustered, crystalline, or hedron-like shape rather than a true spherical shape with round and smooth surfaces. For example, FIG. 7A shows silver nanoparticles formed using a common trisodium citrate method. The nanoparticles are clustered and have a relatively broad size distribution. FIG. 7B shows another set of silver nanoparticles (available from American Biotech Labs, LLC) formed using another chemical synthesis method and showing rough surface morphologies with many edges. FIG. 7C shows a gold nanoparticle having a hedron shape as opposed to a truly spherical shape. FIG. 7D shows a set of silver nanoparticles (sold under the trade name MesoSilver), which have relatively smoother surface morphologies but are understood to be shells of silver formed over a non-metallic seed material.

EXAMPLES

Example 1

An improved electrode paste for application to lead-acid battery electrodes during manufacture or remanufacture is modified by adding gold nanoparticles to the paste (e.g., spherical-shaped gold nanoparticles formed by laser ablation and having a mean diameter of 4 nm). The electrode paste is made by mixing lead (II) oxide (PbO) with sulfuric acid and water to basic form lead sulfate compounds, including one or more of lead sulfate monobasic ($PbO \cdot PbSO_4$), lead sulfate dibasic ($2PbO \cdot PbSO_4$), lead sulfate tribasic ($3PbO \cdot PbSO_4$), or lead sulfate tetrabasic ($4PbO \cdot PbSO_4$). A binder, such as a polymer binder, can be added to the paste. Water and/or carbon black can be added to the paste. Because gold nanoparticles are essentially inert and unreactive, they can be added to the electrode paste before, during, or after forming the lead sulfate compounds.

Example 2

An improved lead-acid battery comprises: a plurality of positive electrode plates comprising lead (IV) oxide ($PbO_2$); a plurality of negative electrode plates comprising ground state lead ($Pb^0$); and electrode paste on at least some of the positive electrode plates and/or negative electrode plates, the electrode paste comprising a carrier, one or more of lead (II) sulfate monobasic ($PbO \cdot PbSO_4$), lead (II) sulfate dibasic ($2PbO \cdot PbSO_4$), lead (II) sulfate tribasic ($3PbO \cdot PbSO_4$), or lead (II) sulfate tetrabasic ($4PbO \cdot PbSO_4$), and ground state gold nanoparticles (e.g., made by laser ablation and having a mean diameter of 4 nm).

Example 3

An improved lead-acid battery is made similar to Example 2, except that a majority of the basic lead (II) sulfate compounds in the electrode paste comprise one or more of lead (II) sulfate dibasic ($2PbO \cdot PbSO_4$), lead (II) sulfate tribasic ($3PbO \cdot PbSO_4$), or lead (II) sulfate tetrabasic ($4PbO \cdot PbSO_4$).

Example 4

An improved lead-acid battery is made similar to Example 3, except that a majority of the basic lead (II) sulfate compounds in the electrode paste comprise one or more of lead (II) sulfate tribasic ($3PbO \cdot PbSO_4$) or lead (II) sulfate tetrabasic ($4PbO \cdot PbSO_4$).

Example 5

An improved lead-acid battery is made similar to Example 3, except that a majority of the basic lead (II) sulfate compounds in the electrode paste comprise lead (II) sulfate tetrabasic ($4PbO \cdot PbSO_4$).

Example 6

A method of manufacturing an improved lead-acid battery, such as in Examples 2-5, comprises: (1) providing an electrode paste comprising a carrier, one or more of lead (II) sulfate monobasic ($PbO \cdot PbSO_4$), lead (II) sulfate dibasic ($2PbO \cdot PbSO_4$), lead (II) sulfate tribasic ($3PbO \cdot PbSO_4$), or lead (II) sulfate tetrabasic ($4PbO \cdot PbSO_4$), and ground state gold nanoparticles (e.g., made by laser ablation and having a mean diameter of 4 nm); (2) applying the electrode paste to a plurality of positive electrode plates comprising lead (IV) oxide ($PbO_2$); (3) applying the electrode paste to a plurality of negative electrode plates comprising ground state lead ($Pb^0$); (4) positioning the positive and negative electrode plates within an insulated container; (5) positioning separators between pairs of positive and negative electrode plates; and (6) placing an electrolyte comprising aqueous sulfuric acid inside the insulated container in contact with the positive and negative electrode plates.

Example 7

The presence of gold (10 nanometers and smaller) nanoparticles in the electrode paste improves discharge utilization, charge acceptance, energy density and life. Gold nanoparticles in the electrolyte is further advantageous. Gold nanoparticles provide more nucleation sites at the grid-active material interface, producing smaller, more numerous $PbSO_4$ crystals. These smaller crystals allow a more porous interface corrosion layer, thereby allowing a higher rate and higher energy density discharge. These also provide a reduced energy barrier to corrosion layer deformation. STEM/EDS imaging shows the gold nanoparticles are indeed inside the $PbSO_4$ crystals formed at the interface and not merely on the grid alloy surface. Increased consistency and reduction of undesired over-condensations of mixed ion species also reduces corrosion Table 1 below shows a comparison of capacitance of lead-acid batteries with and without electrode paste and electrolyte containing gold nanoparticles.

TABLE 1

EIS effective capacitance of the electroactive species reactance with and without gold nanoparticles.

| Sulfation | Control $Z_{DL} => C_{eff}$ | 1 ppm Au NP | $C_{eff}$ % Increase |
|---|---|---|---|
| Mixed (invariant) | 45 µF | 60 µF | +33% |
| Porous (0 hr) | 17 µF | 21 µF | +24% |
| Porous (2 hr) | 34 µF | 151 µF | +344% |
| Porous (5 hr) | 76 µF | 608 µF | +700% |

Example 8

A lead-acid battery is made using an electrode paste that incorporates 1 ppm of gold nanoparticles formed by laser ablation and having a mean particle size of 10 nm or smaller, and optionally an electrolyte that includes sulfuric acid and 1 ppm of gold nanoparticles dispersed therein.

The lead-acid battery effectively holds a charge 4.4 times longer than a conventional lead-acid battery that omits the gold nanoparticles.

Example 9

A lead-acid battery is made using an electrode paste that incorporates 1 ppm of gold nanoparticles formed by laser ablation and having a mean particle size of 10 nm or smaller, and optionally an electrolyte that includes sulfuric acid and 1 ppm of gold nanoparticles dispersed therein.

The lead-acid battery has 80% reduced electrode plate deformation after being subjected to 100 discharging-recharging cycles.

Comparative Example 10

Figure 8A:
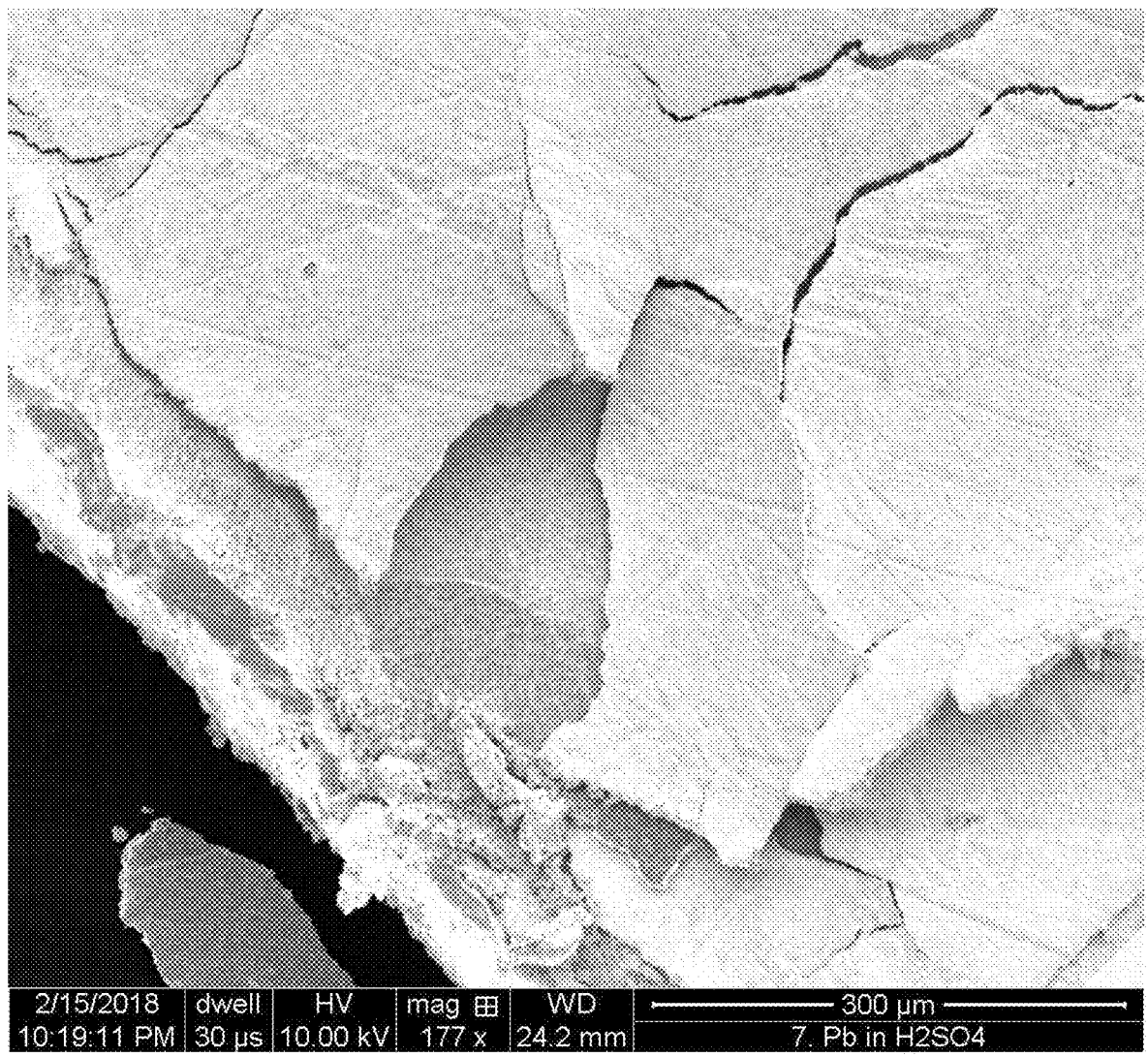
FIGS. 8A and 8B show images of a conventional battery electrode plate from a conventional lead-acid battery.
Figure 8B:
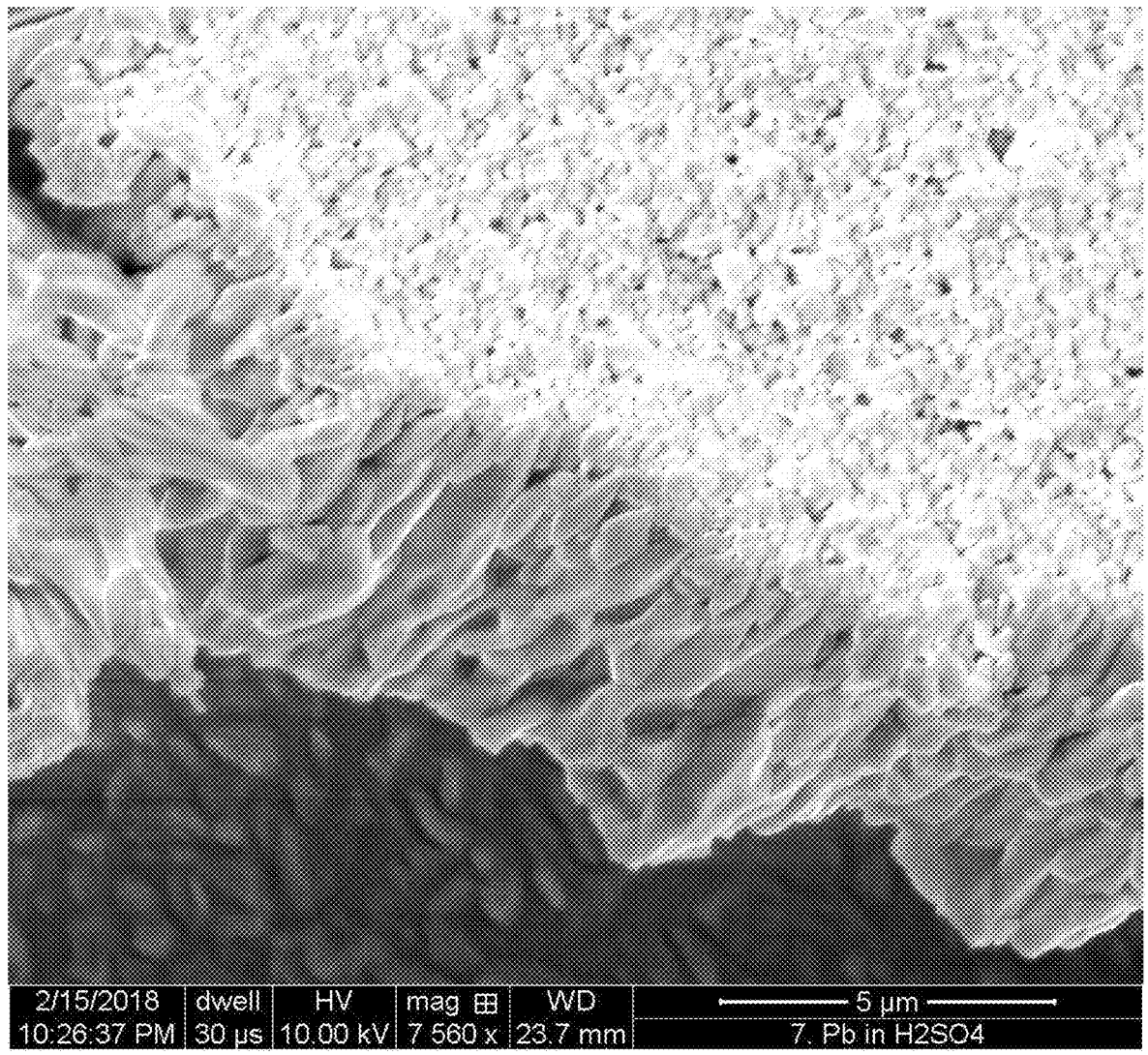

Images of a plate from a conventional lead-acid battery were obtained and are shown in FIGS. 8A and 8B. FIG. 8A shows an edge section of $PbSO_4$ buildup on the electrode plate. FIG. 8B is a magnified view of the same $PbSO_4$ buildup of FIG. 8A. The edge view of FIG. 8B illustrates the relatively large crystalline structure of the $PbSO_4$ buildup. Such crystals resist disassociation during battery recharging and can lead to degradation of battery performance over time.

Example 11

Figure 9A:
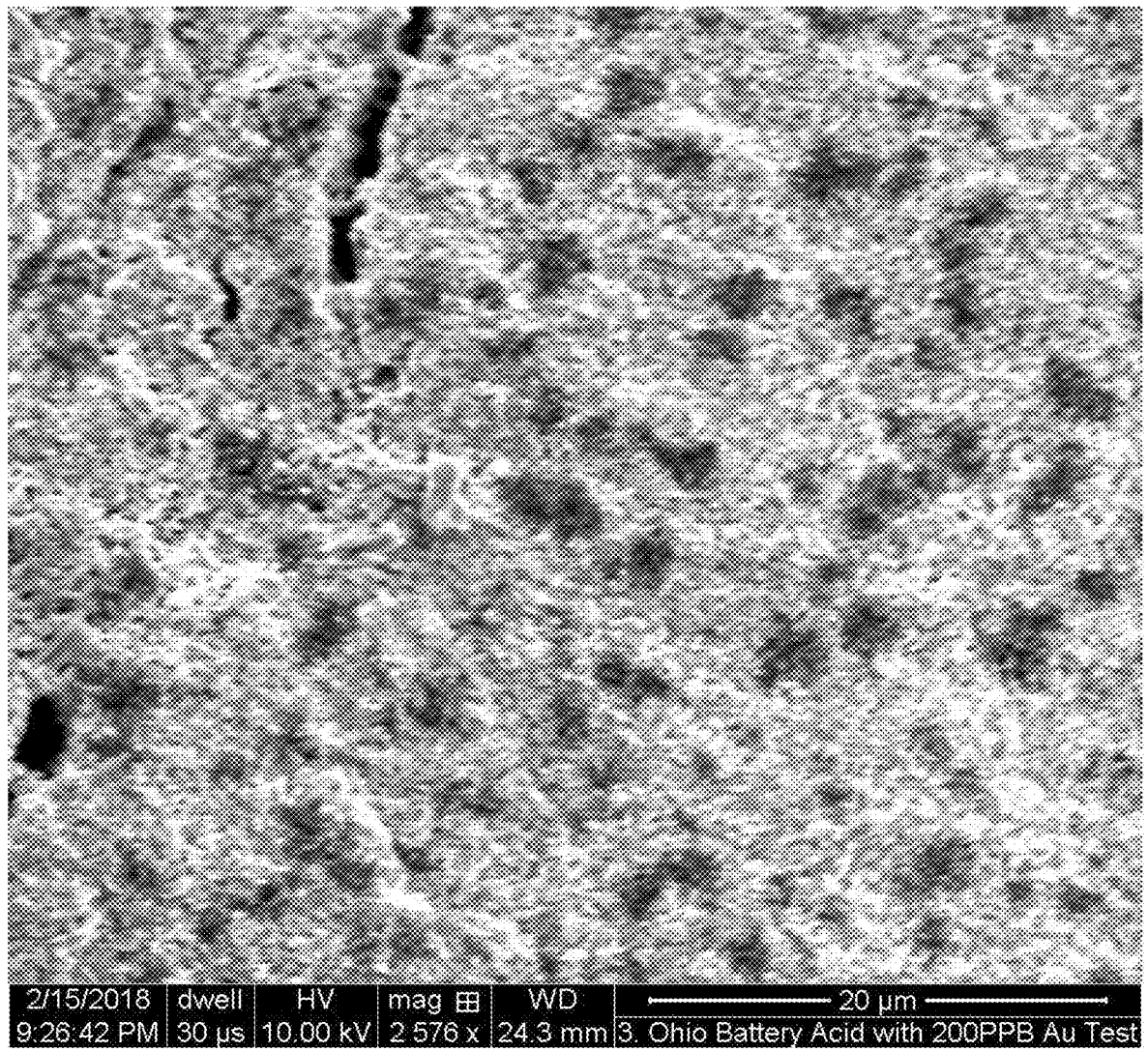
FIGS. 9A and 9B show images of a battery electrode plate from a lead-acid battery that includes gold nanoparticles in the electrode paste and/or electrolyte.
Figure 9B:
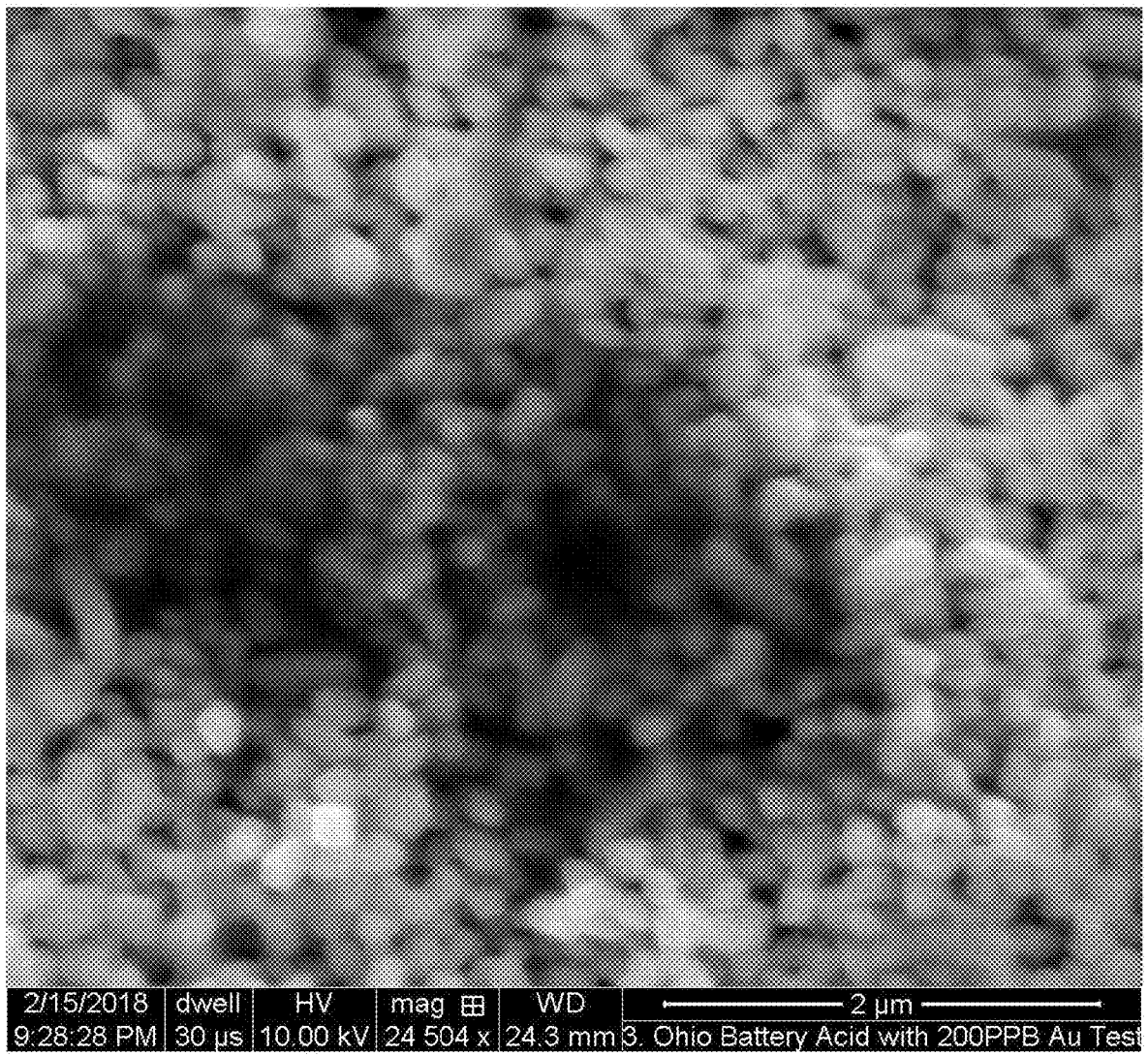

As a comparison, images of a plate from a lead-acid battery that includes an electrode paste and/or electrolyte solution containing gold nanoparticles were obtained and are shown in FIGS. 9A and 9B. From the vantage of FIG. 9A, several darker spots where "craters" have been formed within the $PbSO_4$ layer are visible.

Without being bound to any particular theory, it is believed that the gold nanoparticles associate with grain boundaries at the plate surface and alter the electropotential differences between grain boundaries. The craters result because one or more nanoparticles at a crater site prevent excessive $PbSO_4$ buildup during battery discharge, whereas $PbSO_4$ continues to be deposited at other areas surrounding the crater. The nanoparticles thus function to maintain a greater surface area of exposed underlying Pb or $PbO_2$, which better maintains the ability for effective ion transfer to the electrode plate.

FIG. 9B illustrates a magnified view of a crater within $PbSO_4$ crystals, such as shown in FIG. 9A. As confirmed by EDS, the lighter sections of the image (i.e., the sections surrounding the crater) have a higher proportion of oxygen than the darker sections (i.e., the sections deeper within the crater), indicating that the crater exposes more of the underlying Pb electrode surface relative to the higher levels of $PbSO_4$ surrounding the crater.

Comparative Example 12

Figure 10A:
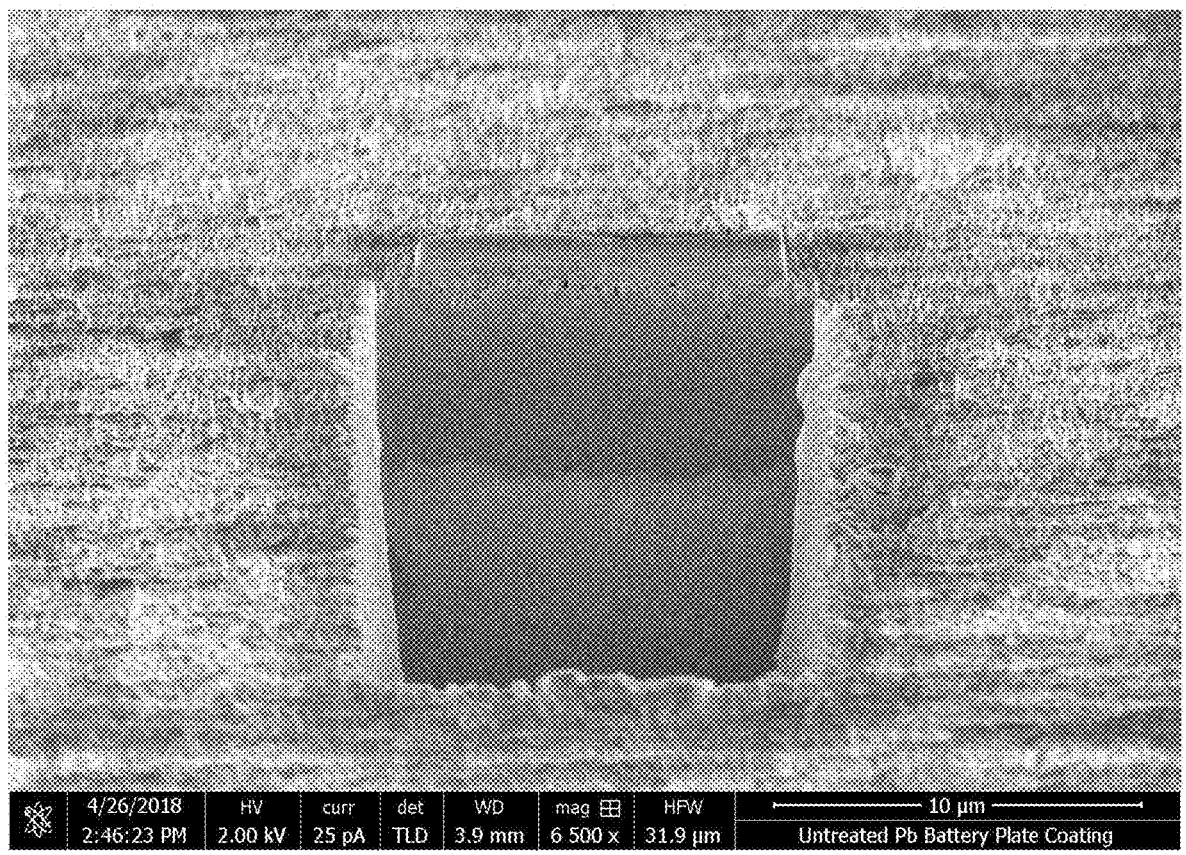
FIGS. 10A and 10B show additional images of a conventional lead-acid battery.
Figure 10B:
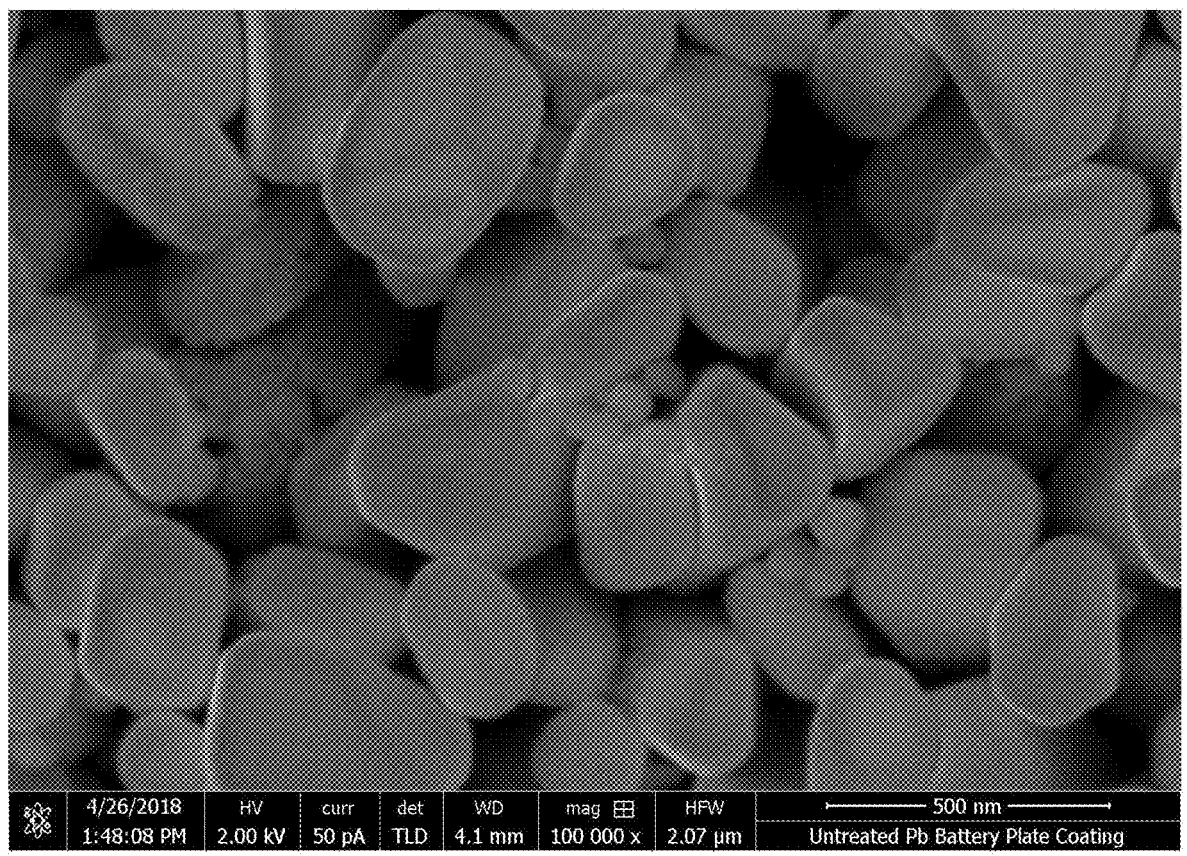

Images of a plate from a conventional lead-acid battery were obtained and are shown in FIGS. 10A and 10B (the visible cutout of FIG. 10A was intentionally applied for cross-sectional visualization). The relatively large size of $PbSO_4$ crystals is visible in the magnified view of FIG. 10B.

Comparative Example 13

Figure 11A:
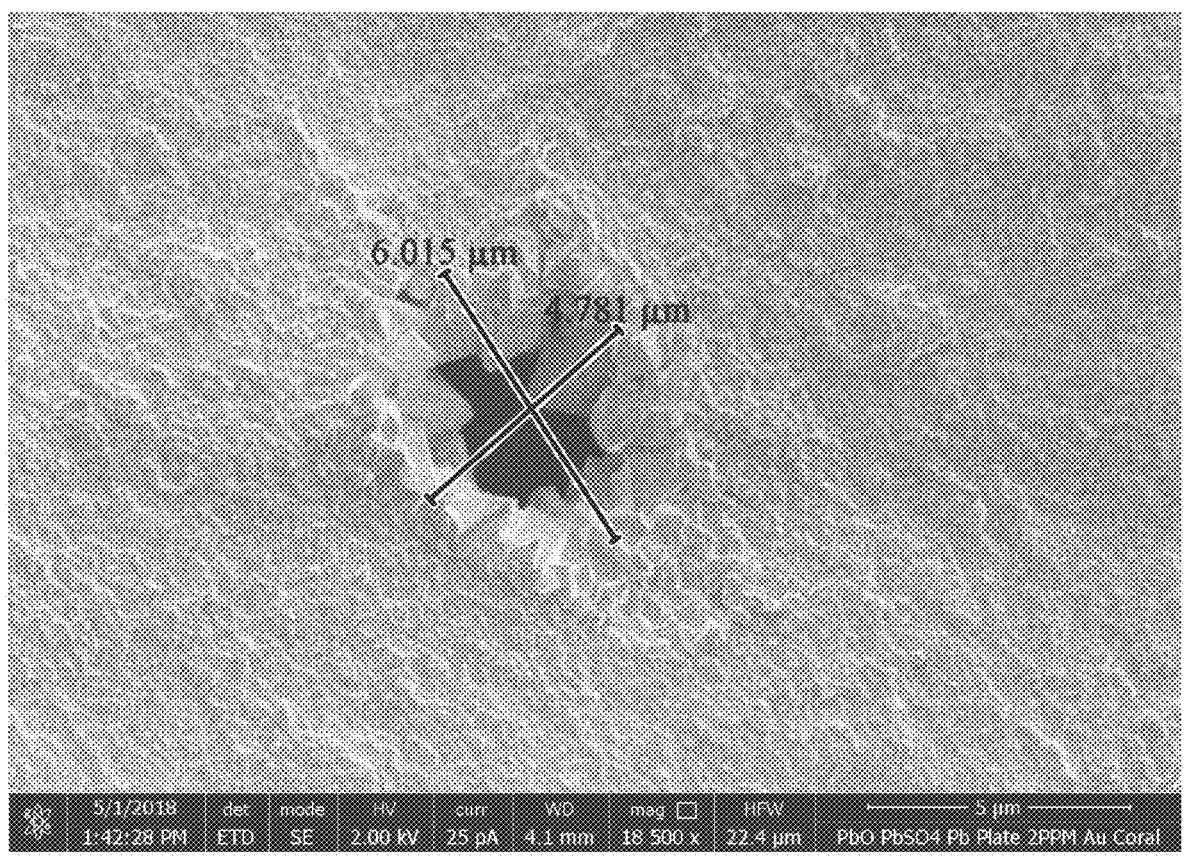
FIGS. 11A and 11B show the surface of a battery electrode plate of a lead-acid battery that includes gold nanoparticles in the electrode paste and/or electrolyte.
Figure 11B:
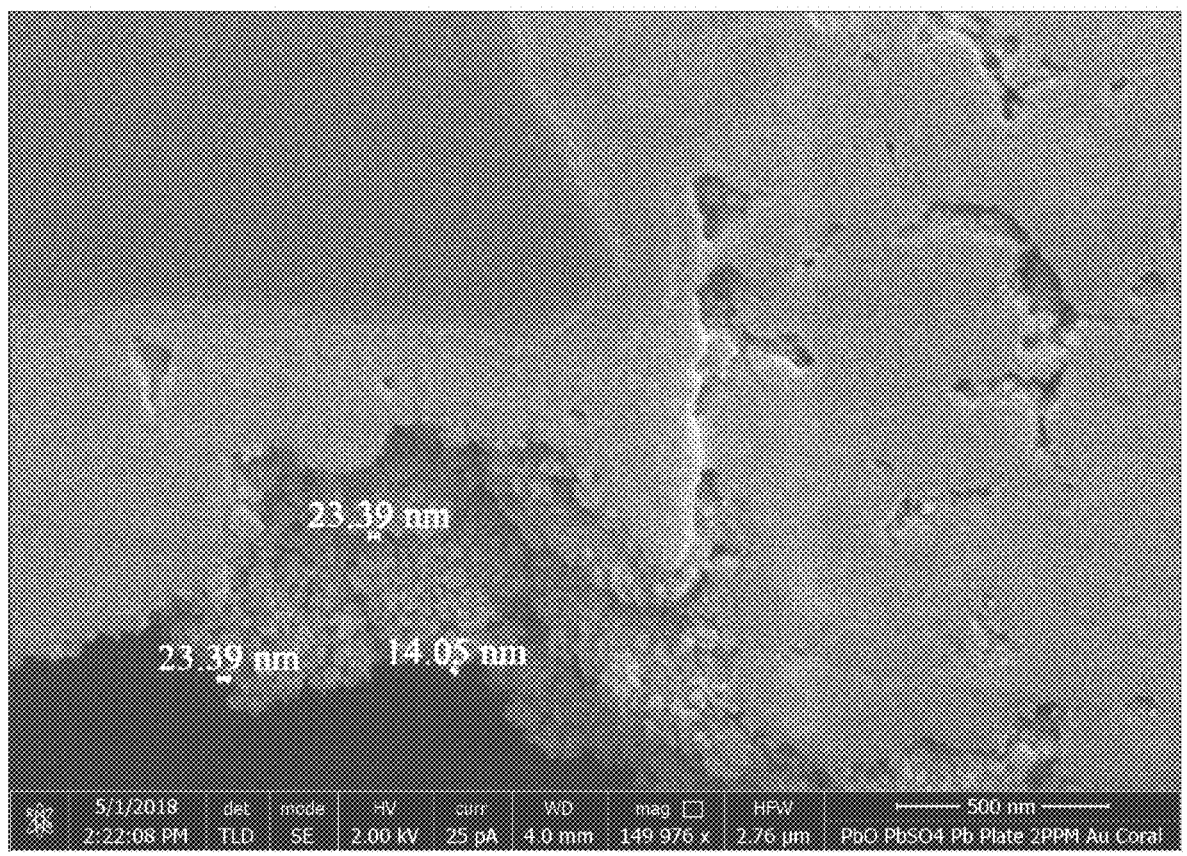

By comparison, FIGS. 11A and 11B show the surface of an electrode plate from a lead-acid battery that includes an electrode paste and/or electrolyte solution containing gold nanoparticles. An edge of the crater shown in FIG. 11A is shown in magnified view in FIG. 11B. The grain sizes of the $PbSO_4$ layer shown on the visualized edge, which are on the order of 10 to 30 nm, are much smaller than the large crystalline structures shown in FIG. 10B. The treated plates are therefore benefitted in that 1) the formed craters provide better effective access to the underlying electrode surface and less resistance to ion transfer, and 2) at least some of the $PbSO_4$ formed on the electrode plate is in a more-preferred smaller grain form that more readily disassociates as compared to larger crystals.

Example 14

A comparative test was performed comparing the performance of new lead-acid batteries (Napa brand, size 7565 batteries), one of which was untreated and one of which was treated by adding gold coral-shaped nanoparticles to the electrode paste and/or electrolyte to a concentration of between 200 ppb to 2 ppm. Discharge/charge cycling performance data was measured according to the standard test procedure BCIOS-06 Rev 10-2012, Section 3. Testing was carried out according to the following:

Test Initiation:

At the completion of pretest conditioning, recorded on-charge voltage, charging rate, temperature, and specific gravity. When all requirements of capacity test conditions were met, the discharge was initiated within 24 hours.

Discharge Cycle:

Mono-blocks and/or battery packs of the test circuit were discharged at the selected constant current discharge rate until the terminal voltage reached 1.75 volts per cell. The discharge time and capacity was recorded in minutes or amp-hours and the % of Rated Capacity was calculated by dividing the discharge capacity by the published rated capacity for that discharge rate. These data points were plotted on a cycle life curve with either Discharge Capacity or % of Rated Capacity plotted against Cycle Number.

Charge Cycle:

Mono-blocks and/or battery packs of the test circuit were recharged per the battery manufacturer's charging recommendations.

Rest Periods:

Following the charge cycle as above, an optional rest period not to exceed eight hours was provided in order to allow the mono-blocks and/or battery packs of the test circuit to cool such that the temperature requirements were maintained.

Electrolyte Level & Specific Gravity

In those batteries with electrolyte access, the electrolyte levels were maintained by periodic water additions in accordance with manufacturer's instructions or such that the level of electrolyte was maintained at a minimum of 6 mm (0.25 in.) above the top of the separators.

Figure 12A:
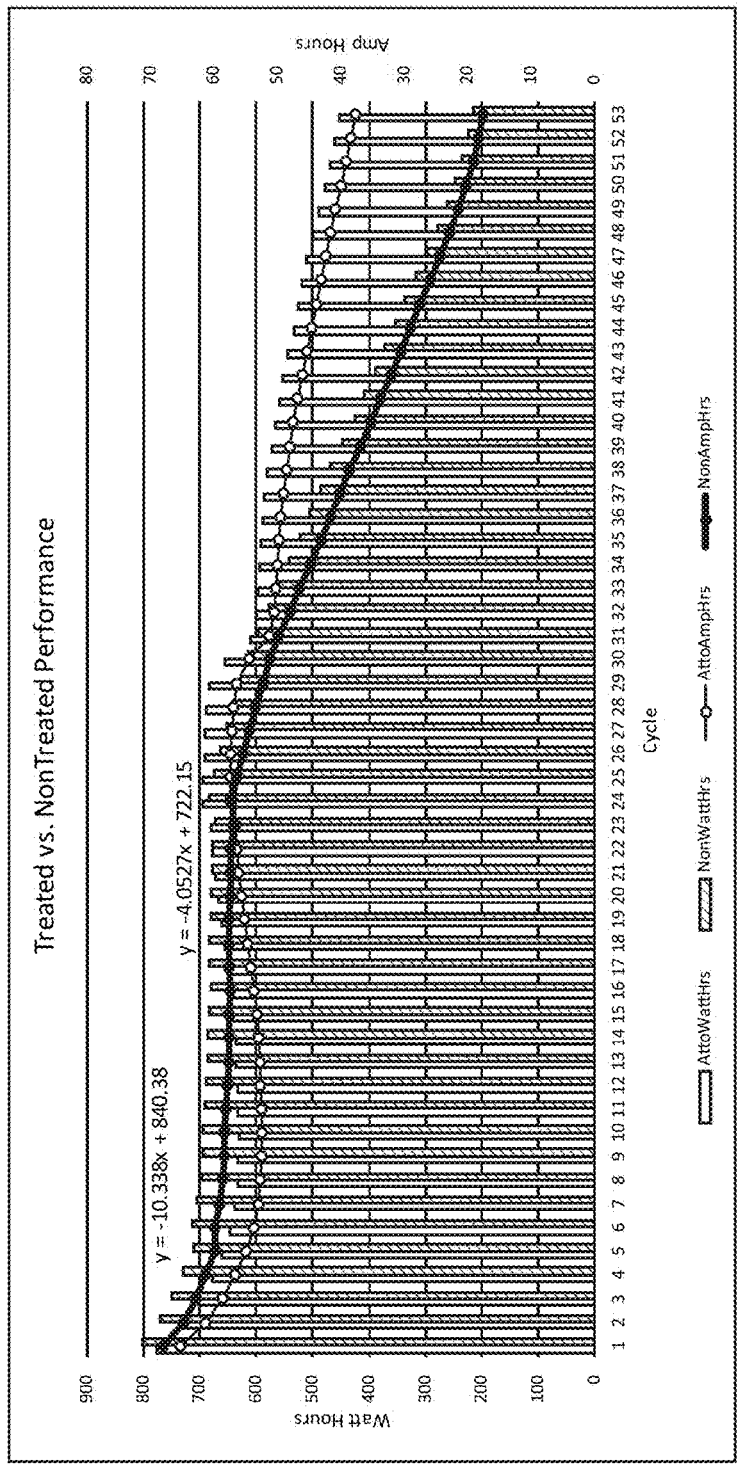
FIGS. 12A and 12B show the results of a comparative performance test between a conventional lead-acid battery and a lead-acid battery that includes gold nanoparticles in the electrode paste and/or electrolyte.
Figure 12B:
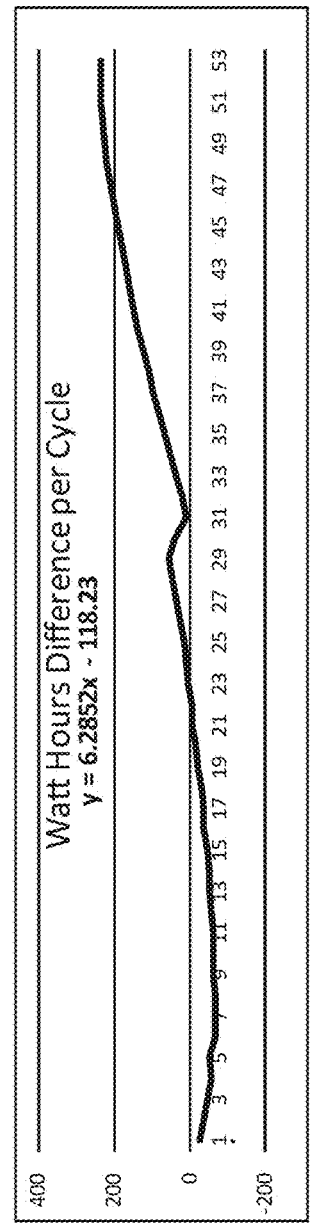

Results:

The comparative testing results are shown in FIGS. 12A and 12B. In FIG. 12A, "AttoWattHrs" and "AttoAmpHrs" represent the performance metrics of the treated battery, while "NonWattHrs" and "NonAmpHrs" represent the performance metrics of the non-treated battery. As shown, both batteries provided similar performance with respect to both watt hours and amp hours until about cycle 22. After cycle 22, the performance of the non-treated battery began to degrade much faster than the treated battery.

At cycle 30, the treated battery was accidentally overcharged, causing some of the electrolyte to boil and causing the relatively abrupt dip in performance. The accidental overcharge was a result of the treated battery reaching a charged state much faster than expected. While the faster charging capability of the treated battery was a surprising benefit of the treatment, the accidental overcharge resulted in an unfortunate dip in performance relative to its expected potential. Nevertheless, despite the overcharging incident, the treated battery continued to provide better performance in both watt hours and amp hours as compared to the nontreated battery as can clearly be shown in the plot of FIG. 12A.

FIG. 12B relates to the same performance data and shows the difference in watt hours between the treated and non-treated battery at each cycle. As shown, as the number of cycles continued, the difference in performance grew increasingly greater.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An electrode paste for use in manufacturing lead-acid batteries comprising:
   a carrier;
   one or more of lead (II) sulfate monobasic ($PbO \cdot PbSO_4$), lead (II) sulfate dibasic ($2PbO \cdot PbSO_4$), lead (II) sulfate tribasic ($3PbO \cdot PbSO_4$), or lead (II) sulfate tetrabasic ($4PbO \cdot PbSO_4$); and
   ground state metal nanoparticles formed by laser ablation so as to have a smooth surface with no external bond angles or edges, wherein the ground state metal nanoparticles are free of capping agents and are not bound to organic molecules.

2. The electrode paste of claim 1, wherein the carrier includes a binder.

3. The electrode paste of claim 2, wherein the binder is a polymer binder.

4. The electrode paste of claim 1, wherein the carrier includes water and/or sulfuric acid.

5. The electrode paste of claim 1, wherein the ground state metal nanoparticles comprise gold.

6. The electrode paste of claim 1, wherein the ground state metal nanoparticles comprise spherical-shaped nanoparticles.

7. The electrode paste of claim 6, wherein the spherical-shaped nanoparticles have a mean diameter of less than 20 nm, or less than 15 nm, or less than 10 nm, or less than 7 nm.

8. The electrode paste of claim 1, wherein the nanoparticles comprise coral-shaped nanoparticles.

9. The electrode paste of claim 8, wherein the coral-shaped nanoparticles have a mean length of less than 100 nm, or less than 80 nm, or less than 60 nm, or less than 40 nm, such as or in a range of 25 nm to 80 nm.

10. The electrode paste of claim 1, wherein the electrode paste includes the ground state metal nanoparticles at a concentration in a range of 100 ppb to 100 ppm, 50 ppm, 25 ppm, 10 ppm, 5 ppm, or 2 ppm.

11. A lead-acid battery having enhanced performance, comprising:
   a plurality of positive electrodes comprising lead (IV) oxide ($PbO_2$);
   a plurality of negative electrodes comprising ground state lead (Pb); and
   an electrode paste coated on or impregnated in at least portion of the positive electrodes and the negative electrodes, the electrolyte electrode paste comprising (i) a carrier, (ii) one or more of lead (II) sulfate monobasic ($PbO \cdot PbSO_4$), lead (II) sulfate dibasic ($2PbO \cdot PbSO_4$), lead (II) sulfate tribasic ($3PbO \cdot PbSO_4$), or lead (II) sulfate tetrabasic ($4PbO \cdot PbSO_4$), and (iii) ground state metal nanoparticles formed by laser ablation so as to have a smooth surface with no external bond angles or edges, wherein the ground state metal nanoparticles are free of capping agents and are not bound to organic molecules; and
   a container in which the positive electrodes, negative electrodes, and electrode paste are positioned.

12. The lead-acid battery of claim 11, further comprising an electrolyte in contact with the positive electrodes and the negative electrodes, the electrolyte comprising aqueous sulfuric acid.

13. The lead-acid battery of claim 11, wherein the inclusion of the metal nanoparticles in the electrode paste increases a fully charged resting voltage of the battery as compared to a fully charged resting voltage of a same battery that omits the metal nanoparticles.

14. The lead-acid battery of claim 11, wherein the inclusion of the metal nanoparticles in the electrode paste increases a cranking amps or cold cranking amps rating of the battery as compared to the cranking amps or cold cranking amps rating of a same battery that omits the metal nanoparticles.

15. The lead-acid battery of claim 11, wherein the inclusion of the metal nanoparticles in the electrode paste increases a reserve capacity of the battery as compared to a reserve capacity of a same battery that omits the metal nanoparticles.

16. The lead-acid battery of claim 12, wherein the electrolyte includes ground state metal nanoparticles.

17. The lead-acid battery of claim 16, wherein the ground state metal nanoparticles are included in a concentration of at least 100 ppb and up to 100 ppm, or up to 50 ppm, or up to 25 ppm, or up to 10 ppm, or up to 5 ppm.

18. A method of manufacturing a lead-acid battery of enhanced performance, comprising:

providing an electrode paste comprising (i) a carrier, (ii) one or more of lead (II) sulfate monobasic ($PbO \cdot PbSO_4$), lead (II) sulfate dibasic ($2PbO \cdot PbSO_4$), lead (II) sulfate tribasic ($3PbO \cdot PbSO_4$), or lead (II) sulfate tetrabasic ($4PbO \cdot PbSO_4$), and (iii) ground state metal nanoparticles formed by laser ablation so as to have a smooth surface with no external bond angles or edges, wherein the ground state metal nanoparticles are free of capping agents and are not bound to organic molecules;

applying the electrode paste to a plurality of positive electrode plates comprising lead (IV) oxide ($PbO_2$);

applying the electrode paste to a plurality of negative electrode plates comprising ground state lead (Pb); and positioning the positive and negative electrode plates within an electrically insulated container.

19. The method of claim 18, further comprising positioning separators between pairs of positive and negative electrode plates.

20. The method of claim 18, further comprising placing an electrolyte comprising aqueous sulfuric acid inside the insulated container in contact with the positive and negative electrode plates.

21. A method of manufacturing an enhanced battery electrode paste comprising:

providing a battery electrode paste formed from lead oxide, sulfuric acid, and water to form one or more lead sulfate compounds selected from $PbO \cdot PbSO_4$ (monobasic lead sulfate), $2PbO \cdot PbSO_4$ (dibasic lead sulfate), $3PbO \cdot PbSO_4$ (tribasic lead sulfate), and $4PbO \cdot PbSO_4$ (tetrabasic lead sulfate); and adding nonionic, ground state gold or gold alloy nanoparticles that are free of capping agents and not bound to any organic molecules to yield the enhanced battery electrode paste, wherein the gold or gold alloy nanoparticles are formed by laser ablation so as to have a smooth surface with no external bond angles or edges.

* * * * *